United States Patent
Veijalainen et al.

(10) Patent No.: US 11,330,450 B2
(45) Date of Patent: May 10, 2022

(54) ASSOCIATING AND STORING DATA FROM RADIO NETWORK AND SPATIOTEMPORAL SENSORS

(71) Applicant: NOKIA TECHNOLOGIES OY, Espoo (FI)

(72) Inventors: Teemu Mikael Veijalainen, Helsinki (FI); Lauri Ilari Kuru, Espoo (FI); Jani Matti Johannes Moilanen, Helsinki (FI); Leo Mikko Johannes Kärkkäinen, Helsinki (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 17/280,757

(22) PCT Filed: Sep. 28, 2018

(86) PCT No.: PCT/EP2018/076436
§ 371 (c)(1),
(2) Date: Mar. 26, 2021

(87) PCT Pub. No.: WO2020/064121
PCT Pub. Date: Apr. 2, 2020

(65) Prior Publication Data
US 2021/0314790 A1    Oct. 7, 2021

(51) Int. Cl.
*H04L 12/26*    (2006.01)
*H04W 24/02*    (2009.01)
*H04W 24/08*    (2009.01)

(52) U.S. Cl.
CPC ........... *H04W 24/02* (2013.01); *H04W 24/08* (2013.01)

(58) Field of Classification Search
CPC .............................. H04W 24/02; H04W 24/08
USPC .................. 370/252–253, 329–333, 335–345
See application file for complete search history.

(56) References Cited

U.S. PATENT DOCUMENTS

| 10,564,251 B1* | 2/2020 | Baxley ................ G01S 5/02216 |
| 2006/0133540 A1* | 6/2006 | Eglit ..................... H04L 7/0054 |
| | | 375/324 |
| 2007/0071153 A1* | 3/2007 | Eglit ................... H04L 25/0216 |
| | | 375/355 |
| 2009/0310501 A1 | 12/2009 | Catovic et al. |

(Continued)

OTHER PUBLICATIONS

International Search Report and Written Opinion for International Application No. PCT/EP2018/076436, dated May 22, 2019, 13 pages.

(Continued)

*Primary Examiner* — Thai D Hoang
(74) *Attorney, Agent, or Firm* — Brake Hughes Bellermann LLP

(57) ABSTRACT

A technique may include receiving, from one or more sensors, sensor data samples; receiving radio network information data samples associated with a radio network; determining one or more associated sensor and radio network information data samples based on an association of one or more received sensor data samples with one or more of the received radio network information data samples; selecting at least some of the one or more associated sensor and radio network information data samples that are relevant to performance of the radio network; and forwarding the selected associated sensor and radio network information data samples for subsequent use.

19 Claims, 16 Drawing Sheets

(56) References Cited

U.S. PATENT DOCUMENTS

| | | | |
|---|---|---|---|
| 2013/0057394 A1 | 3/2013 | Andiappan et al. | |
| 2013/0288666 A1* | 10/2013 | Shah | H04W 24/00 |
| | | | 455/423 |
| 2014/0184649 A1* | 7/2014 | Bak | G06T 11/206 |
| | | | 345/660 |
| 2014/0285660 A1 | 9/2014 | Jamtgaard et al. | |
| 2015/0016412 A1 | 1/2015 | Horn et al. | |
| 2016/0197800 A1 | 7/2016 | Hui et al. | |
| 2016/0277244 A1* | 9/2016 | Reichert, Jr. | H04N 21/42203 |
| 2017/0006434 A1* | 1/2017 | Howe | H04W 4/021 |
| 2017/0090007 A1 | 3/2017 | Park et al. | |
| 2018/0184339 A1 | 6/2018 | Hehn et al. | |
| 2019/0068443 A1* | 2/2019 | Li | H04L 43/022 |
| 2021/0326726 A1* | 10/2021 | Wang | G06N 5/04 |

OTHER PUBLICATIONS

International Preliminary Report on Patentability for International Application No. PCT/EP2018/076436, dated Jan. 21, 2021, 28, pages.
Papaioannou et al.; "Fusion of Radio and Camera Sensor Data for Accurate Indoor Positioning"; 2014 IEEE 11th International Conference on Mobile Ad Hoc and Sensor Systems; Philadelphia, PA, USA; Oct. 28-30, 2014; pp. 109-117.

* cited by examiner

ASSOCIATING AND STORING DATA FROM RADIO NETWORK AND SPATIOTEMPORAL SENSORS

CROSS-REFERENCE TO RELATED APPLICATIONS

This application is a national stage entry of International Application No. PCT/EP2018/076436, filed Sep. 28, 2018, entitled "ASSOCIATING AND STORING DATA FROM RADIO NETWORK AND SPATIOTEMPORAL SENSORS" which is hereby incorporated by reference in its entirety.

TECHNICAL FIELD

This description relates to wireless communications.

BACKGROUND

A communication system may be a facility that enables communication between two or more nodes or devices, such as fixed or mobile communication devices. Signals can be carried on wired or wireless carriers.

An example of a cellular communication system is an architecture that is being standardized by the 3$^{rd}$ Generation Partnership Project (3GPP). A recent development in this field is often referred to as the long-term evolution (LTE) of the Universal Mobile Telecommunications System (UMTS) radio-access technology. S-UTRA (evolved UMTS Terrestrial Radio Access) is the air interface of 3GPP's Long Term Evolution (LTE) upgrade path for mobile networks. In LTE, base stations or access points (APs), which are referred to as enhanced Node AP (eNBs), provide wireless access within a coverage area or cell. In LTE, mobile devices, or mobile stations are referred to as user equipments (UE). LTE has included a number of improvements or developments.

5G New Radio (NR) development is part of a continued mobile broadband evolution process to meet the requirements of 5G, similar to earlier evolution of 3G & 4G wireless networks. In addition, 5G is also targeted at the new emerging use cases in addition to mobile broadband. A goal of 5G is to provide significant improvement in wireless performance, which may include new levels of data rate, latency, reliability, and security. 5G NR may also scale to efficiently connect the massive Internet of Things (IoT), and may offer new types of mission-critical services. For example, ultra-reliable and low-latency communications (URLLC) devices may require high reliability and very low latency.

SUMMARY

According to an example embodiment, a method includes receiving, from one or more sensors, sensor data samples; receiving radio network information data samples associated with a radio network; determining one or more associated sensor and radio network information data samples based on an association of one or more received sensor data samples with one or more of the received radio network information data samples; selecting at least some of the one or more associated sensor and radio network information data samples that are relevant to performance of the radio network; and forwarding the selected associated sensor and radio network information data samples for subsequent use.

According to an example embodiment, an apparatus includes at least one processor and at least one memory including computer instructions, when executed by the at least one processor, cause the apparatus to receive, from one or more sensors, sensor data samples; receive radio network information data samples associated with a radio network; determine one or more associated sensor and radio network information data samples based on an association of one or more received sensor data samples with one or more of the received radio network information data samples; select at least some of the one or more associated sensor and radio network information data samples that are relevant to performance of the radio network; and forward the selected associated sensor and radio network information data samples for subsequent use.

According to an example embodiment, a non-transitory computer-readable storage medium includes instructions stored thereon that, when executed by at least one processor, are configured to cause a computing system to perform a method of receiving, from one or more sensors, sensor data samples; receiving radio network information data samples associated with a radio network; determining one or more associated sensor and radio network information data samples based on an association of one or more received sensor data samples with one or more of the received radio network information data samples; selecting at least some of the one or more associated sensor and radio network information data samples that are relevant to performance of the radio network; and forwarding the selected associated sensor and radio network information data samples for subsequent use.

The details of one or more examples of embodiments are set forth in the accompanying drawings and the description below. Other features will be apparent from the description and drawings, and from the claims.

DETAILED DESCRIPTION

Figure 1:
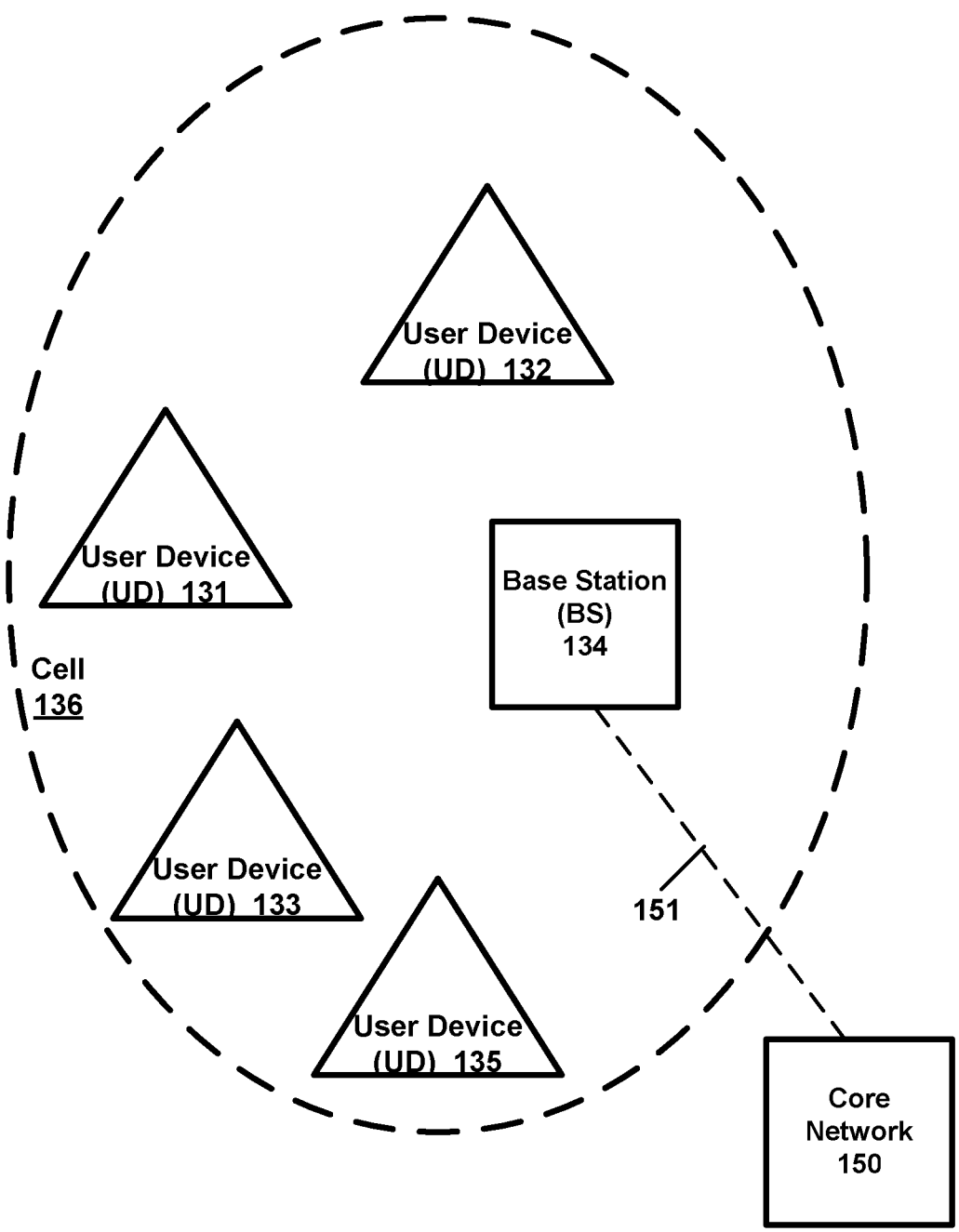
FIG. 1 is a block diagram of a wireless network according to an example embodiment.

FIG. 1 is a block diagram of a wireless network 130 according to an example embodiment. In the wireless network 130 of FIG. 1, user devices 131, 132, 133 and 135, which may also be referred to as mobile stations (MSs) or user equipment (UEs), may be connected (and in communication) with a base station (BS) 134, which may also be referred to as an access point (AP), an enhanced Node B (eNB) or a network node. At least part of the functionalities of an access point (AP), base station (BS) or (e)Node B (eNB) may also be carried out by any node, server or host which may be operably coupled to a transceiver, such as a remote radio head. BS (or AP) 134 provides wireless coverage within a cell 136, including to user devices 131, 132, 133 and 135. Although only four user devices are shown as being connected or attached to BS 134, any number of user devices may be provided. BS 134 is also connected to a core network 150 via a S1 interface 151. This is merely one simple example of a wireless network, and others may be used.

A user device (user terminal, user equipment (UE)) may refer to a portable computing device that includes wireless mobile communication devices operating with or without a subscriber identification module (SIM), including, but not limited to, the following types of devices: a mobile station (MS), a mobile phone, a cell phone, a smartphone, a personal digital assistant (PDA), a handset, a device using a wireless modem (alarm or measurement device, etc.), a laptop and/or touch screen computer, a tablet, a phablet, a game console, a notebook, and a multimedia device, as examples, or any other wireless device. It should be appreciated that a user device may also be a nearly exclusive uplink only device, of which an example is a camera or video camera loading images or video feed to a network.

In LTE (as an example), core network 150 may be referred to as Evolved Packet Core (EPC), which may include a mobility management entity (MME) which may handle or assist with mobility/handover of user devices between BSs, one or more gateways that may forward data and control signals between the BSs and packet data networks or the Internet, and other control functions or blocks.

In addition, by way of illustrative example, the various example embodiments or techniques described herein may be applied to various types of user devices or data service types, or may apply to user devices that may have multiple applications running thereon that may be of different data service types. New Radio (5G) development may support a number of different applications or a number of different data service types, such as for example: machine type communications (MTC), enhanced machine type communication (eMTC), Internet of Things (IoT), and/or narrowband IoT user devices, enhanced mobile broadband (eMBB), and ultra-reliable and low-latency communications (URLLC).

IoT may refer to an ever-growing group of objects that may have Internet or network connectivity, so that these objects may send information to and receive information from other network devices. For example, many sensor type applications or devices may monitor a physical condition or a status, and may send a report to a server or other network device, e.g., when an event occurs. Machine Type Communications (MTC, or Machine to Machine communications) may, for example, be characterized by fully automatic data generation, exchange, processing and actuation among intelligent machines, with or without intervention of humans. Enhanced mobile broadband (eMBB) may support much higher data rates than currently available in LTE.

Ultra-reliable and low-latency communications (URLLC) is a new data service type, or new usage scenario, which may be supported for New Radio (5G) systems. This enables emerging new applications and services, such as industrial automations, autonomous driving, vehicular safety, e-health services, and so on. 3GPP targets in providing connectivity with reliability corresponding to block error rate (BLER) of $10^{-5}$ and up to 1 ms U-Plane (user/data plane) latency, by way of illustrative example. Thus, for example, URLLC user devices/UEs may require a significantly lower block error rate than other types of user devices/UEs as well as low latency (with or without requirement for simultaneous high reliability). Thus, for example, a URLLC UE (or URLLC application on a UE) may require much shorter latency, as compared to a eMBB UE (or an eMBB application running on a UE).

The various example embodiments may be applied to a wide variety of wireless technologies or wireless networks, such as LTE, LTE-A, 5G, cm Wave, and/or mmWave band networks, IoT, MTC, eMTC, eMBB, URLLC, etc., or any other wireless network or wireless technology. These example networks, technologies or data service types are provided only as illustrative examples.

As noted, 5G technologies are expected to significantly increase data rates (or bandwidths) and/or decrease latency. Many of the 5G technologies, such as URLLC, may require very strict performance, such as guaranteed low latency. However, the dynamic nature of a physical environment may cause radio network performance to frequently or continuously change. In some cases, environmental changes may cause radio network performance to degrade to a level that does not meet required 5G performance requirements for some 5G applications (e.g., URLLC applications), such as requirements for BLER or latency, as noted above. A UE or BS may measure a change in a KPI (key performance indicator), such as a change in signal-to-interference plus noise ratio, received signal strength, block error rate (BLER), or other KPI or measurement, e.g., indicating a degrading radio network performance. However, due to very strict 5G network performance requirements (e.g., for latency and/or BLER or other requirements), in many cases, there may not be sufficient time for a UE or BS to detect a degrading radio network performance, e.g., of the radio/wireless channel between the UE and BS), and then take an action to improve radio network performance before the performance of the radio network or wireless channel drops below an acceptable level for 5G application(s). According to an illustrative example, a UE or BS may detect a drop in SINR or received signal strength, for example, of a wireless channel between the UE and BS, and then may request or perform an increase in connection robustness (e.g., by using more robust modulation and coding scheme and/or activating additional multi-connectivity links), or a handover to another BS, e.g., to avoid a disconnection or in attempt to improve radio network performance for the UE. Thus, for example, such a reactive approach of detecting a radio network performance change (e.g., detecting a decrease in SINR or decrease in received signal strength or other KPI change), and then subsequently reacting to such detected change by performing some action for the radio network may not be adequate for the strict latency and BLER requirements of 5G wireless networks. For example, increasing the connection robustness and/or performing a handover reactively, in this example, may still result in radio network performance degrading to a level that is below the requirements of 5G (e.g., BLER and/or latency may be unacceptably high, or even a connection failure may occur). This problem in reacting to a measured change in a radio measurement or measured KPI for the radio network may arise because, for example, by the time the change in measurement or KPI for the radio network has been detected, there may be insufficient time to perform one or more actions to avoid further degradation in network performance.

Therefore, according to an example embodiment, a more predictive or a more preemptive approach may be used to address an expected or predicted change in radio network performance based on one or more associated sensor and radio network information data samples. A key benefit or technical advantage of such approach is that, it enables execution or performing of preemptive corrective actions before the network performance has degraded below an acceptable level for critical application(s), such as URLLC. This is possible because the associated sensor and radio network data brings new information for the optimization method thus allowing to predict events that are not predictable (or difficult to predict) with the traditional approach, that is to utilize only the radio network data. For example, a deterministic nature of a physical environment may be used to perform one or more preemptive corrective actions, such as one or more preemptive corrective radio network actions and/or preemptive corrective non-radio network actions, e.g., to improve radio network performance. Some of the associated sensor and radio network information data samples may be selected that are relevant to performance of the radio network (e.g., associated with or may indicate a likely or expected decrease in radio network performance). For example, based on past associated sensor data samples and radio network information data samples, specific patterns in behavior or movement of objects or changes in the physical environment may be associated with current and/or future (e.g., expected or predicted) changes in radio network performance. The selected associated sensor and radio network information data samples may be forwarded for subsequent use (e.g., stored in a database for processing, or used to perform an action to improve radio network performance). Thus, because spatiotemporal sensor data related to the physical environment may correlate with certain radio network information, the associated sensor and radio network information (ASRI) data samples may be used to predict future radio network performance. In particular, the prediction of future radio network performance may be enhanced through the use of spatiotemporal sensor data (that is associated with radio network information), as compared to using only radio network information. For example, one or more actions may be performed based on the associated sensor and radio network information (ASRI) data samples, e.g., such as increasing transmission power, changing a modulation and coding scheme for a UE to a more robust or lower MCS, performing a handover of the UE to a different BS, or other radio network action.

According to an example embodiment, a method may include: receiving, from one or more sensors, sensor data samples; receiving radio network information data samples associated with a radio network; determining, based on an association of one or more received sensor data samples with one or more of the received radio network information data samples, one or more associated sensor and radio network information data samples; selecting at least some of the one or more associated sensor and radio network information data samples that are relevant to performance of the radio network; and forwarding the selected associated sensor and radio network information data samples for subsequent use.

The deterministic nature of most URLLC environments, provides high gain potential for network to predictively optimize its parameters. According to an example embodiment, radio network measurements (e.g., UE measurements) may be mapped to or associated with the state of the physical environment. These mappings or associated information this information may then be used by models or predictive algorithms (such as artificial intelligence models or methods such as reinforcement learning with Q-learning, or other models) for network self-optimization, in order to improve network performance. In this manner, states and actions which are leading to better performance or errors can be detected, and actions (e.g., radio network actions, or possible changes in the physical environment) may be performed that are predicted or expected to improve radio network performance (e.g., increase SINR, avoid a connection failure or disconnection, reduce latency, . . . ).

Figure 2:
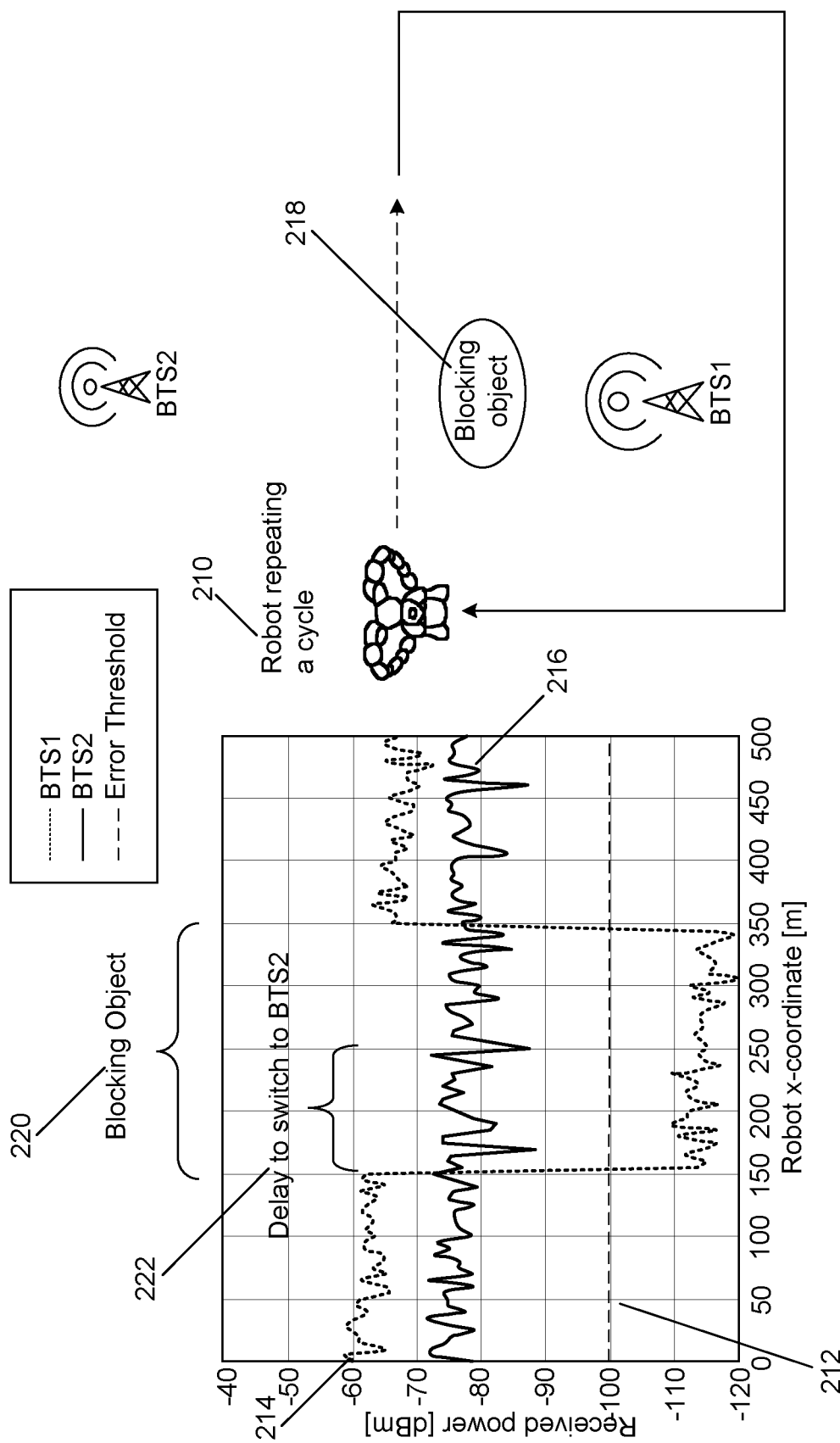
FIG. 2 is a diagram illustrating deterministic behavior between location of a user device/UE provided on a robot and changes in received power for the user device/UE due to a blocking object according to an example embodiment.

FIG. 2 is a diagram illustrating deterministic behavior between location (or position) of a user device/UE provided on a robot and changes in received power for the user device/UE due to a blocking object according to an example embodiment. In the illustrative example shown in FIG. 2, a signal blockage at 220 occurs between UE (robot repeating a deterministic path) and base station BTS1 when the robot 210 passes behind a blocking object 218 with respect to BTS1, resulting in a signal level 214 from BTS1 that drops below an error threshold 212, e.g., when the robot/UE is located at an x-coordinate of between 150 m and 350 m (220).

According to an example embodiment, one solution to this type of situation may include a handover of the UE on the robot 210 from BTS1 to BTS2 (which does not suffer the decrease in received power, as shown by received power signal 216 from BTS2). However, a delay 222 to perform such handover of the UE from BTS1 to BTS2 is very significant, and may not be short enough to prevent a loss in the connection (or dropped connection) between the UE and BTS1. As noted, one solution to solve this issue is a handover of the UE to BTS2. However since the traditional handover methods are reactive and the signal level drops very fast, the delay 222 to switch (or handover) to BTS2 causes errors that are not tolerated by the URLLC requirements, as an example. Since the radio signal variations before the signal blockage won't necessarily indicate the upcoming decrease in received power by the UE, the traditional methods of reacting to the decrease in received power (or other detected decrease in network performance) may not effectively prevent further degradation in network performance or an error condition for the radio network. For example, as noted above, a reactionary approach to improve a radio network performance (e.g., performing an action only after a decrease in radio network performance has been measured or detected by a UE or BS) may typically not prevent further decrease in radio network performance, or even avoid certain error conditions, for 5G networks (e.g., URLLC or other applications) that may have very strict requirements in terms of latency, BLER, handover delay, data rate, reliability, . . . In other words, due to the strict performance requirements of some 5G applications, such as URLLC, there may not be sufficient time, after detection of a decrease in network performance (e.g., detecting a decrease in SINR or received signal strength), to perform a radio network action to prevent a further and unacceptable decrease in radio network performance.

Therefore, according to an example embodiment, a correlation or association between radio network performance (or data samples associated with a radio network) and sensor data samples that indicate a state of a physical environment (e.g., location of the robot) may be used to predict a future radio network performance and/or perform an radio network action that may improve network performance. For example, based on an association or correlation between robot location/position and received power, a handover of the UE may be performed preemptively (e.g., before a significant decrease in received power is detected) when the location of the robot 210 moves from 130 m to 140 m (e.g., location is before the x-coordinate of 150 m where the decrease in radio network performance (e.g., received power) is first typically detected. In this example, the handover from BTS1 to BTS2 may be performed when robot reaches an x-coordinate of 140 m, in order to provide sufficient time that is greater than or equal to delay 222, e.g., to improve performance of the radio network (e.g., in this case, to avoid a decrease in received power below threshold 212 and/or a loss in the connection between UE and BTS1).

Figure 3:
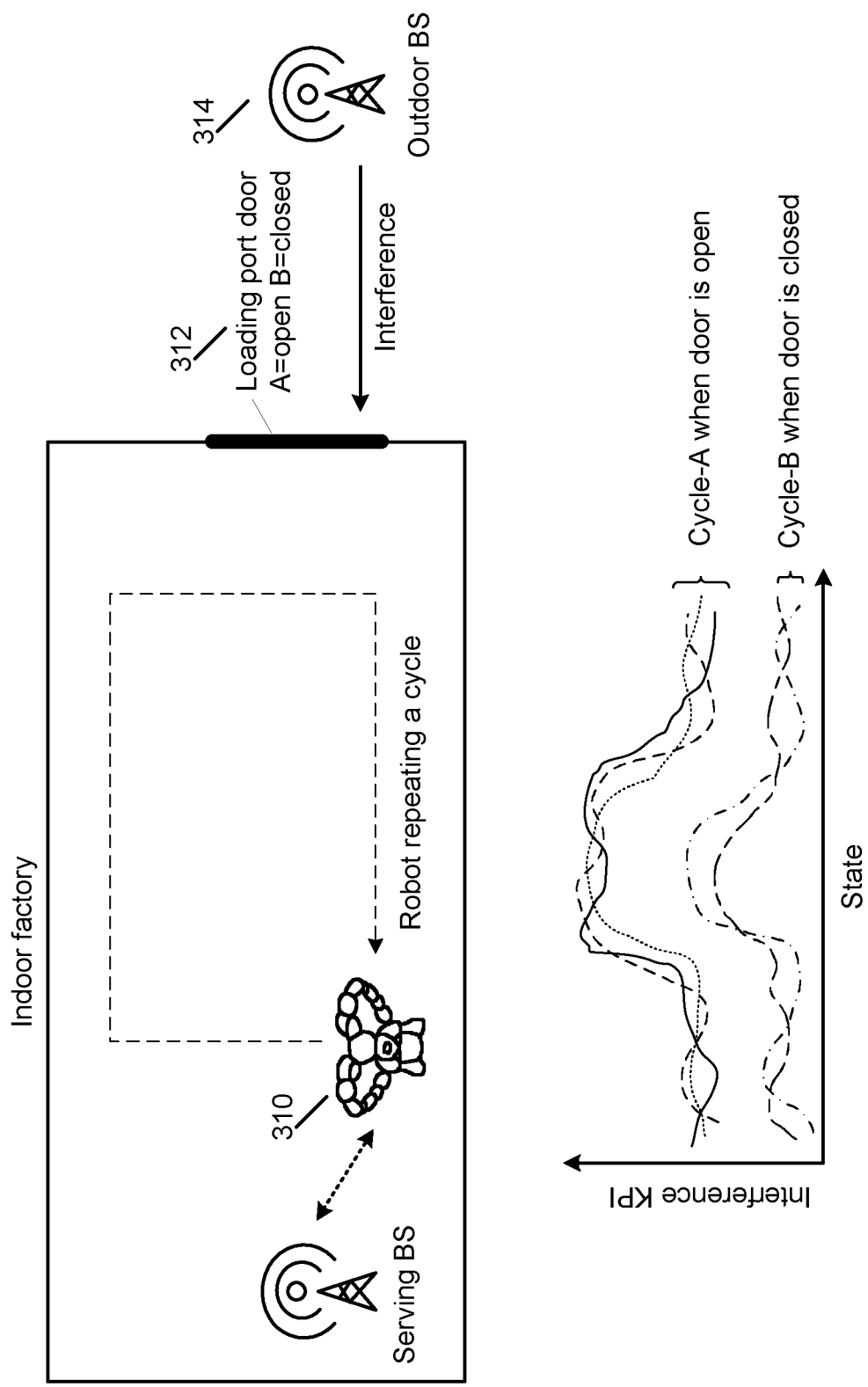
FIG. 3 is a diagram illustrating a robot that repeats a cycle in a factory according to an example embodiment.

Thus, a challenge may exist in how to consider dynamic changes of the physical environment that impact the deterministic behavior of the radio channel or radio network (introducing another deterministic cycle). The problem is demonstrated in FIG. 3 where a robot 310 repeats a cycle in a factory. When loading port door 312 of the factory is closed, interference from outdoor base station 314 experienced by the robot 310 follows a deterministic cycle-A. When the door opens more interference propagates indoors and a new deterministic cycle is introduced (cycle-B). For example, a state of the physical environment may indicate a state, location, position, orientation (or other physical characteristic) of physical objects in the environment. For instance, the location of robots, orientation of robot arms etc. Thus, in this case, the state of the loading port door 312 may be associated with a current or future radio network performance. Thus, as shown in FIG. 3, the interference from the outdoor BS 314 is greater when the loading port door 312 is open. Thus, in this example, it can be seen that the state of the physical environment may be used to predict a future state of the radio network (or future state of radio network performance, and/or may be used to try different actions (e.g., different radio network actions and/or physical environment actions) to determine which action provides the best improvement in radio network performance. For example, one or more actions may be performed (or even performed and then measured to determine which action(s) provide the best performance increase), such as, e.g., increasing transmission power to the UE of robot 310, or using a more robust modulation and coding scheme for a transmission to the UE/robot 310 just before the loading port door 312 opens, or changing the loading port door to open at a different time that impacts the radio network performance less.

According to an example embodiment, a method may include receiving, from one or more sensors, sensor data samples; receiving radio network information data samples associated with a radio network; determining, based on an association of one or more received sensor data samples with one or more of the received radio network information data samples, one or more associated sensor and radio network information data samples; selecting at least some of the one or more associated sensor and radio network information data samples that are relevant to performance of the radio network; and forwarding the selected associated sensor and radio network information data samples for subsequent use. According to an example embodiment, the sensor data samples comprise spatiotemporal sensor data samples associated with a physical environment. For example, spatiotemporal data samples may include data samples, which indicate a state of an object or a state of the physical environment at a particular time or sample time. Also, according to an example embodiment, the forwarding may include, e.g., storing the selected associated sensor and radio network information data samples, and/or forwarding the selected associated sensor and radio network information data samples for processing. The method may further include performing, based on the selected associated sensor and radio network information data samples, at least one action, e.g., where the action may include, for example, performing a radio network action such as adjusting a radio network parameter or configuration, and/or performing an action with respect to the physical environment such as moving or changing a state of an object) to improve performance of the radio network. For example, the performing the action may include one or more of the following: one or more radio network actions; one or more automated radio network actions; one or more automated radio network actions triggered by a network self-optimization algorithm; and/or one or more non-radio network actions (e.g., actions associated with the physical environment) where an object or an aspect of the physical environment is changed to improve performance of the radio network. Also, for example, the receiving, from one or more sensors, sensor data samples may include receiving sensor data samples associated with one or more of the following: a button, switch, or controller that controls an object or portion of the physical environment; a button, switch, or controller that controls a position, orientation or a movement of an object; a button, switch, or controller that controls a status or state of an object; a camera that captures images or video feed of an object or portion of a physical environment; and a sensor that detects a status or state of an object or portion of the physical environment. In a further example, the receiving sensor data associated with a sensor that detects a status or state of an object or portion of the physical environment may include, e.g., receiving sensor data from a Radar or LiDAR that performs detection, ranging, bearing or location determination of an object or portion of the physical environment.

Also, for example, the receiving radio network information associated with a radio network may include receiving at least one of the following, by way of illustrative example: a radio network key performance indicator for the radio network; information associated with a radio network action; and a radio network configuration parameter. Also, by way of example, the radio network key performance indicator may include one or more of (these are merely illustrative examples): a received signals strength; a total received power; a received interference power; and a signal to interference plus noise ratio (SINR); a pathloss; a reference signal received power; a reference signal received quality; a received signal strength indicator; a reliability; a block error rate; a latency; a jitter; a coverage; a capacity; a data transfer rate; a rank indicator; a modulation and coding scheme indicator; a channel state information; and a timing advance.

Also, according to an example embodiment, the determining one or more associated sensor and radio network information data samples may include, by way of example: determining, based on a time of one or more sensor data samples being within a time window of one or more of the radio network information data samples, one or more associated sensor and radio network information data samples. Also, the determining one or more associated sensor and radio network information data samples may include: determining that a first sensor is paired or associated with at least a first communications element; and, determining, based on a time of one or more sensor data samples from the first sensor that are within a time window of one or more of the radio network information data samples associated with at least the first communications element, one or more associated sensor and radio network information data samples. For example, the communications element may include, e.g., a computer or a server, or a radio network element associated with the radio network, including at least one of a base station (BS), a user device (or UE), a core network element, or other radio network element. Also, the selecting at least some of the one or more associated sensor and radio network information data samples that are relevant to performance of the radio network may include one or more of the following, for example: selecting at least some of the one or more associated sensor and radio network information data sample that occur or are sampled before a change in performance of the radio network; selecting at least some of the one or more associated sensor and radio network information data sample that occur or are sampled during a change in performance of the radio network; and selecting at least some of the one or more associated sensor and radio network information data sample that occur or are sampled after a change in performance of the radio network. Also, for example, the selecting at least some of the one or more associated sensor and radio network information data samples that are relevant to performance of the radio network may include one or more of: selecting at least some of the one or more associated sensor and radio network information data sample that occur or are sampled before a decrease in performance of the radio network; selecting at least some of the one or more associated sensor and radio network information data sample that occur or are sampled during a decrease in performance of the radio network; and selecting at least some of the one or more associated sensor and radio network information data sample that occur or are sampled after a decrease in performance of the radio network. Also, the method may further include labeling a reason for selection of the selected associated sensor and radio network information data samples that are relevant to performance of the radio network.

Figure 4:
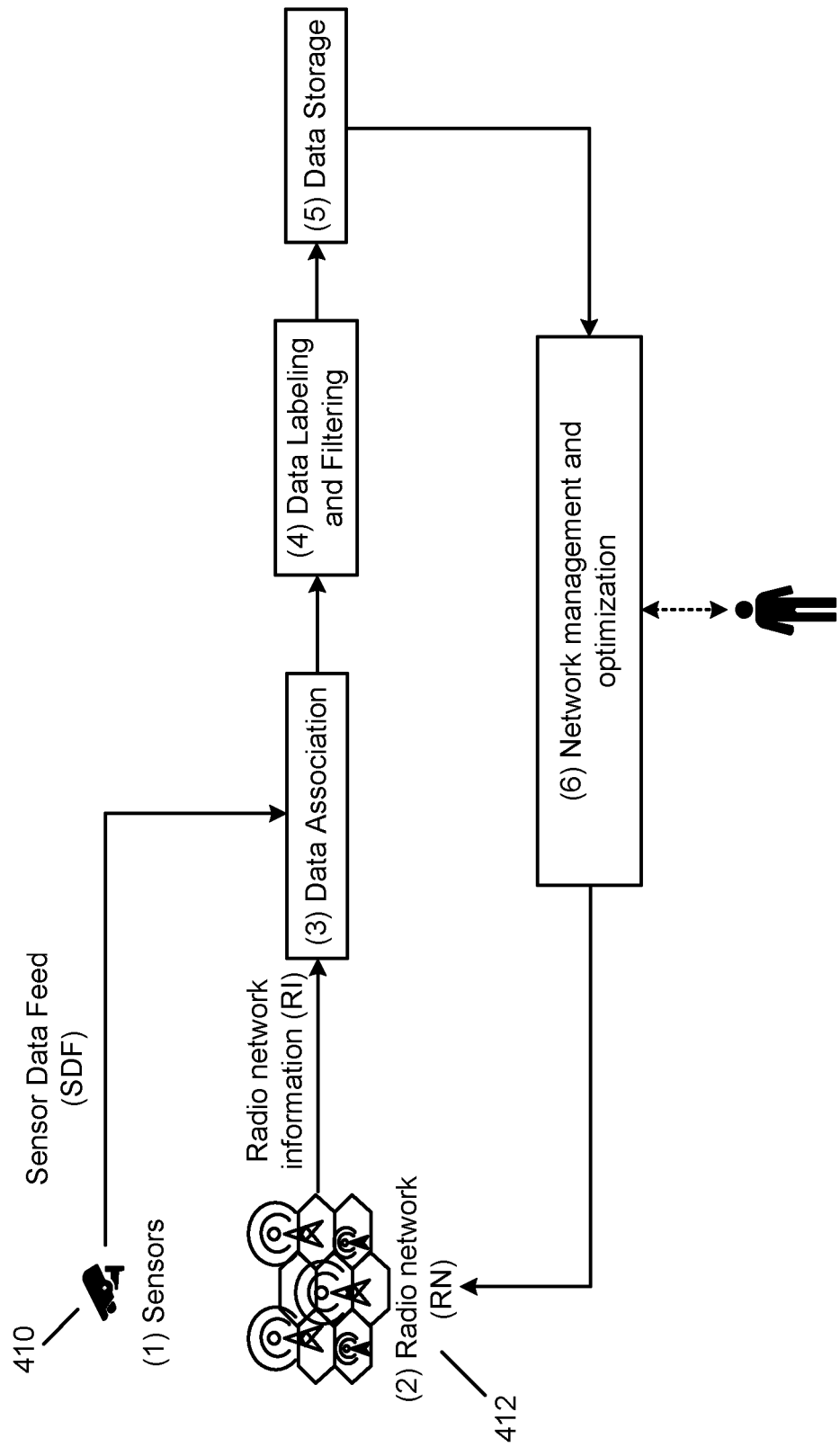
FIG. 4 is a diagram illustrating operation of a network according to an example embodiment.

FIG. 4 is a diagram illustrating operation of a network according to an example embodiment. The network in FIG. 4 may include one or more sensors 410 that may generate sensor data samples associated with a state of the physical environment, e.g., such as a location, position, orientation or other state of an object. The network may also include a radio network 412, such may include, e.g., a core network, one or more BSs, and/or one or more UEs. Radio network 412 may provide radio network information data samples that indicate a state of the radio network and/or a state of radio network performance, such as indicating a value for one or more key performance indicators for the radio network, for example. As a brief overview, the system may include or perform the following:

1) Sensors capturing spatiotemporal data from the environment

2) Radio-Network (RN) capturing RN Information (RI)

3) RI is associated with the sensor data feed (SDF)

4) The associated data samples considered to be relevant for network performance are labeled and selected from the stream of data 5) The relevant associated data samples are stored to a database or forwarded directly for further processing.

6) The associated data is input for the network management and optimization entity.

Further example details, by way of example, are described below.

1) Sensor in this context refers to any device that can sense spatiotemporal changes of the environment. Sensors may be stationary or mobile, and one or plurality of them may co-locate as part of a larger system (e.g. various sensors located in drones, (self-driving) cars, or robots). Some, but non-limiting, examples of such sensors include;

A) buttons or switches that control the environment (e.g. a button which opens a door);

B) cameras that capture images or video feed of the environment (e.g. cameras placed at the radio installation, or even already existing surveillance camera installations); and C) lidar, radar, or any other sensor that provides detection, ranging, bearing, or location information. Lidar is a surveying method that measures distance to a target by illuminating the target with pulsed laser light and measuring the reflected pulses with a sensor. Radar may include a system for detecting the presence, direction, distance, and/or speed of aircraft, ships, and/or other objects, by sending out pulses of high-frequency electromagnetic waves that are reflected off the object back to the source.

2) RN information may include e.g., radio network key performance indicators (KPIs) for the radio network, information associated with a radio network action, and/or a radio network configuration parameter. RN KPIs may include KPIs such as throughput, latency, jitter, reliability and RN measurements (e.g., received signal strength, total received power, received interference power). RN parameters may include identifiers, configurations, or coordinates of base stations and UEs. Also, RN actions may include information related to a radio network action, such as information related to handovers, load balancing, link adaptation, cell re-selection, a change in MCS, a change in transmission power, or a change or update in any other network-related parameter.

3) The association of RI and SDF may refer, for example, to associating the two data streams in time domain; sensor feed sample SDF(k, t1) for sensor k at time t1, is associated with RN information RI(j, t2) from base station j at time t2, where time difference |t1-t2| is within time window threshold. For example, an image from a camera k captured at time t1, is associated with signal strength measurement of base station j at time t2. In a further embodiment, the association is done only for pre-configured pairs of devices (e.g. a base station is paired with cameras that capture images or video feed from area that overlaps with coverage area of the base station or coverage area of its' strongest interferers).

4) The associated data samples considered to be relevant for network performance may be selected from the stream of data. In an example embodiment, relevant data samples may include samples that impact or are associated with a change in radio network performance, such as being associated with a decrease in radio network performance. For instance, spatiotemporal changes that have impact to the radio signal propagation, e.g., moving objects impacting the radio link quality by blocking strongest path of the signal or introducing new strong radio paths (for interfering or own signal) are considered relevant. The relevancy of data sample is decided by pre-determined rules. For example, data during certain time window before and after a sudden change in the RN performance (e.g. signal strength has dropped or increased >x dBs within a short pre-defined time interval). The irrelevant data is filtered out which reduces the load of the network (computational load of the post processing applications using the data, transport load, etc.) The samples may also be labeled to indicate the reason for the selection, e.g., labeling each data sample to indicate either a pre-error label that would mean data before the error (or before the decrease radio network performance), and post-error label that would mean data after the error (or after the decrease in radio network performance).

5) The relevant associated data samples are stored to a database from which data can be fetched for later use, or they are continuously forwarded for some further processing (e.g., to optimize the network performance).

6) A network management and optimization entity may receive and/or take the associated data (or associated sensor and radio network information (ASRI)) as an input. Based on the associated data (or ASRI), actions are performed to improve RN performance. The actions can be RN actions or other actions that impact to the radio network performance e.g.:

A) Automated RN actions triggered by a network self-optimization algorithm (e.g. network self-adjusts its' parameters or triggers corrective actions);

B) Manual RN actions triggered via human interface (e.g. network parameters are adjusted via user interface of a network management system, or network deployment or configuration is adjusted manually); and C) Non-RN actions where the physical environment (or a state of the physical environment) is changed so that the RN performance is improved (e.g., an object that is deteriorating radio signal quality is shifted, moved, altered in some way, or completely removed from the environment).

Further example embodiments and example details are now described.

Figure 5:
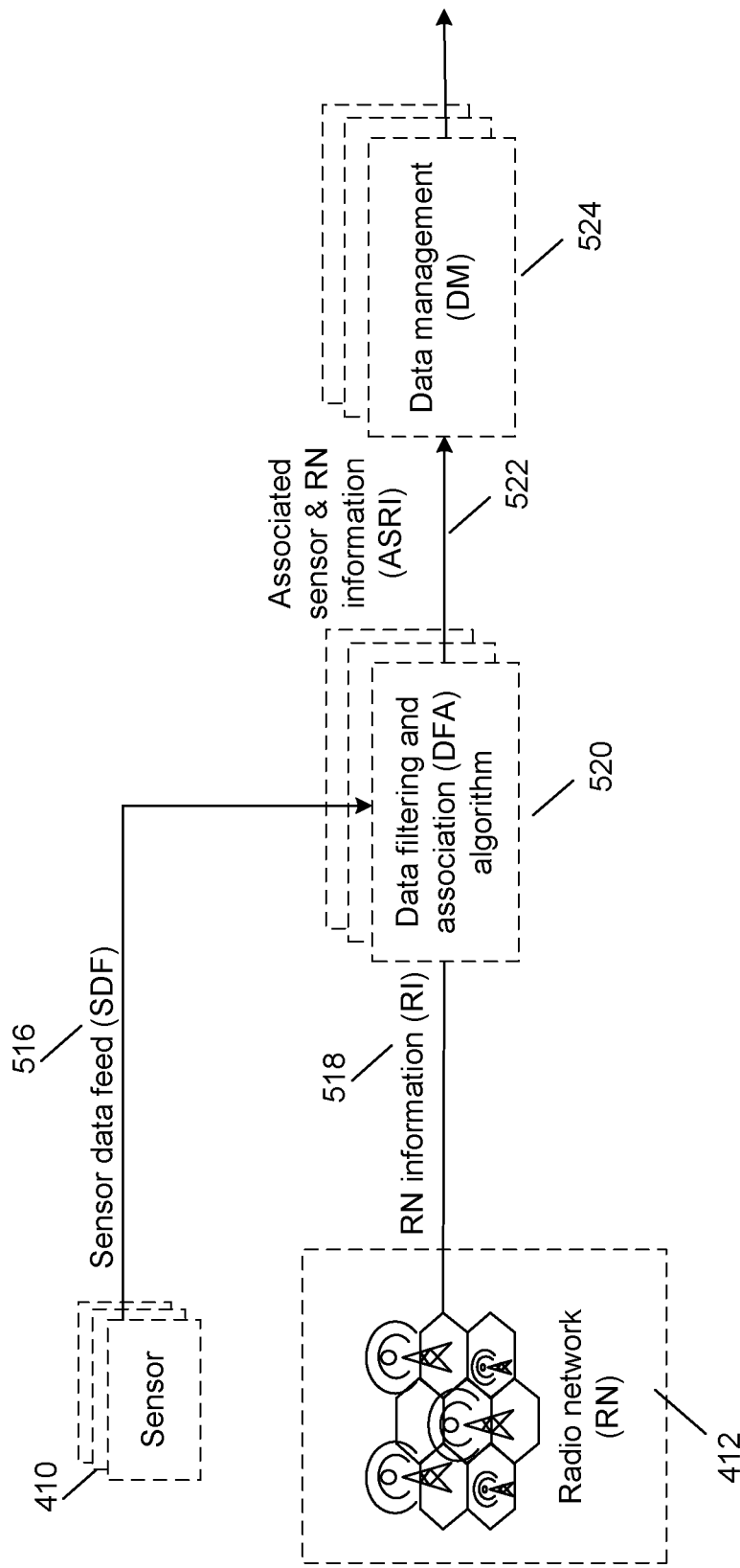
FIG. 5 is a diagram illustration associating sensor data samples with radio network information data samples according to an example embodiment.

FIG. 5 is a diagram illustration associating sensor data samples with radio network information data samples according to an example embodiment. Sensors 10 may sense or measure or identify one or more parameters associated with a physical environment. According to an example embodiment, a DFA (Data Filtering and Association) (or DFA algorithm) is the logical entity that associates the RI (radio network information) 518 and SDFs (sensor data feeds) 516. The associated data is called Associated Sensor and Radio-Network Information (ASRI) 522. The storage where ASRI data 522 samples are stored is called Data Management (DM). A sensor data feed (SDF) 516 is output from sensors 410 to DFA 520. As noted, radio network (RN) 412 may include BSs, UEs, and/or core network entities, or other radio network nodes or entities. Radio network information (RI) 518 is output from RN 412 to DFA 520.

FIG. 5 is a diagram illustrating an example embodiment of the DFA and DM. Sensors 410, and a radio network (RN) 412, a DFA 520, and a data management (DM) entity 524 are shown in FIG. 5. Measurements: Sensor Data Feed (SDF) 516 & RI (Radio-Network Information) 518 are fed (or input) to the DFA 520. Both data feeds may have their own interface specified. DFA 520 (or DFA-Algorithm 520) controls the data stream towards the Data Management (DM) 524. The DFA 520 may associate and filter the relevant data from the streams (SDF 516 and RI 518) of data that are considered to be relevant for the network performance, and also labels the data with the reason of relevancy. There can be one or more instances of the DFA 520, meaning that different data sources may be processed by different instance of DFA 520 (DFA-Algorithm) in different physical or logical locations. The DFA instances can be located e.g., in RN base stations, a Mobile Edge Computing (MEC) server or any other server or computer. The implementation of the DFA 520 (DFA-Algorithm) is implementation specific. It contains pre-programmed rules to trigger the data association.

Mobile Edge Computing (MEC) is an emerging technology in 5G era which enables, for example, the provision of the cloud and IT services or applications within the proximity of mobile subscribers. It allows the availability of the cloud or application servers in proximity to the BS (e.g., a MEC server within or as part of the BS, a MEC server provided within the enclosure(s) or building(s) where the BS equipment is located, or a MEC server very near to the BS, by way of illustrative example. For example, by providing an application on a MEC server (which may be referred to as a MEC application), the end-to-end latency perceived by the mobile user is therefore reduced with the MEC platform. MEC servers may offer other advantages as well.

With reference to FIG. 5, according to an example embodiment, Data Management (DM) 524 is a logical entity where the associated data (ASRI) 522 may be sent to. The DM 524 may have one or more of the following functionalities, by way of example: data storage, instant forwarding of the incoming data, forwarding of the stored data (e.g., ASRI data). This entity is optional in a sense that the ASRI data 522 can be forwarded directly to any entity that can understand the protocol which is used to transmit the ASRI data 522. Like with the DFA 520, the architecture can be distributed or central, meaning that the data (e.g., ASRI data) streams from DFA (DFA-Algorithm) 520 instances can be connected to one or more instances of DMs 524 in different physical or logical locations.

DFA

This sub-section describes the high-level view of the DFA 520. DFA (Data-Filtering-and-Association) 520 associates the data from the radio network and sensors, and filters and labels the relevant data from the stream of data that are considered to be relevant for the network performance. There can be several instances of the DFA 520 in different logical or physical locations, meaning for instance that some sensors are connected to DFA instance inside RN base stations while rest of the sensors are connected to different DFA-Instances inside a MEC server. To allow this type of implementation, several interface protocols needs to be defined. This should also allow implementation in a multi-vendor network.

Figure 6:
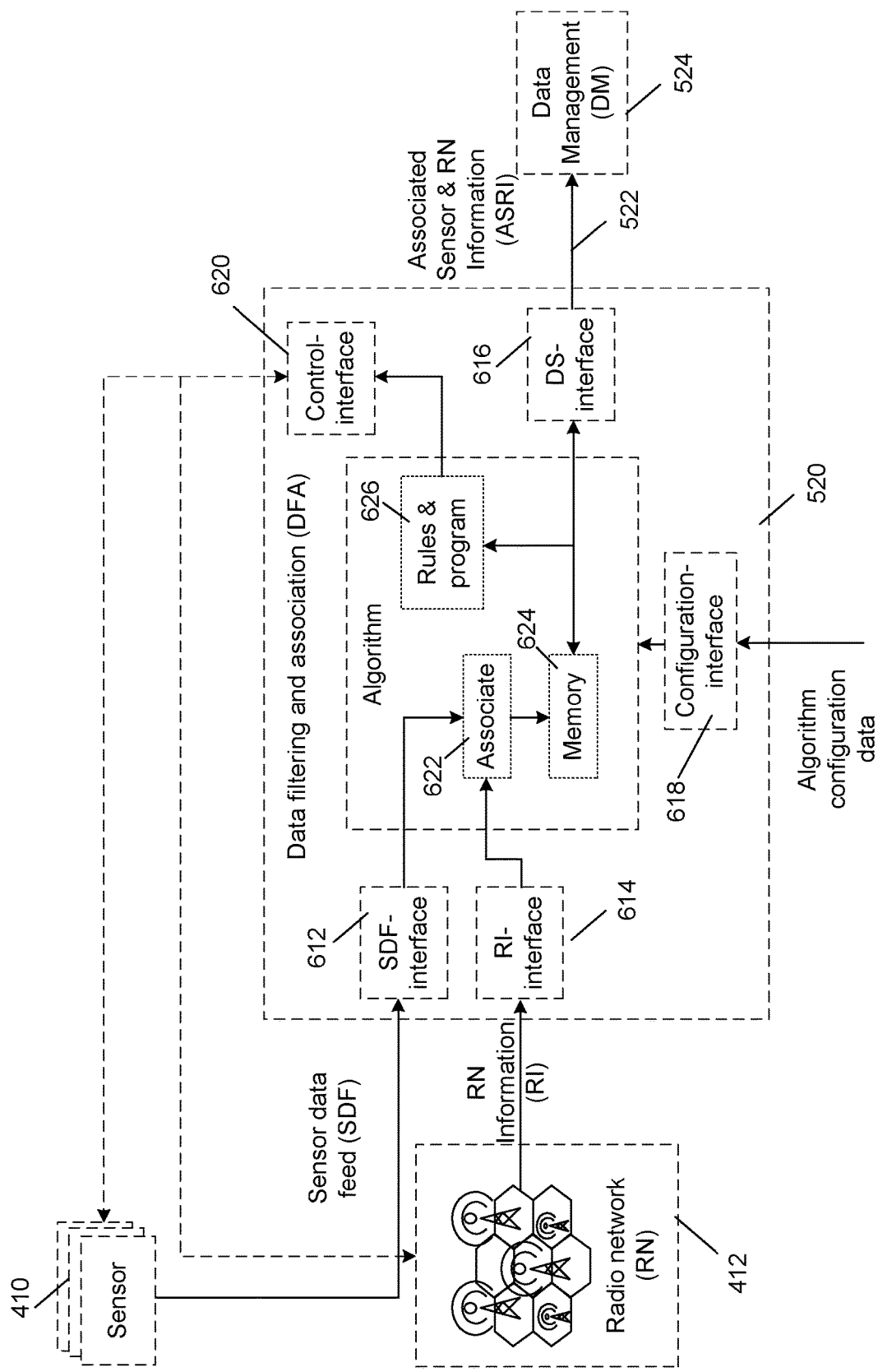
FIG. 6 is a diagram illustrating a Data-Filtering-and-Association (DFA) according to an example embodiment.

FIG. 6 is a diagram illustrating a Data-Filtering-and-Association (DFA) according to an example embodiment. SDF (sensor data feed)-Interface 612 defines a protocol to transfer sensor data. The protocol may e.g., indicate the type of data, time stamp of each data sample, etc. RI-Interface 614 defines a protocol to transfer of radio network information (RI). The protocol may, for example, indicate the type of data, time stamp for each data sample, etc. DS-Interface 616 defines a protocol to transfer ASRI information to the DM 524. Configuration-Interface 618 defines a protocol to configure the operation or algorithm of DFA 520, e.g., based on DFA algorithm configuration data. Through this interface 618, custom data association algorithms or rules can be implemented in each DFA 520 instance. Control-Interface 620 defines a protocol to send instructions from a set of pre-defined instructions to control or provide feedback to sensors 410 and/or 412. For instance, instead of continuously transmitting the SDF, when RI indicates an error in the network (e.g., which, in some cases, may be a decreased radio network performance), the interface 620 may be used to instruct a sensor to transmit the SDF of previous 10 seconds and the next 10 seconds. This saves transmission bandwidth since the sensors stream the data only when needed. In addition, the interface 620 may be used to control the data stream from the radio network.

According to an example embodiment, DFA (or DFA Algorithm) 520 may include three example functions or components, which may include: 1) Associate function 622 may perform association of the SDF and RI data. In a simple example embodiment DFA 520 (e.g., associate 622) may associate data samples (associate sensor data samples and radio network information data samples) that arrive within a certain time window. Thus, data association may be performed by DFA 520 based on a time relationship of sensor data samples and RI samples, e.g., that arrive or have a time stamp within a time threshold. Such implementation is sufficient as long as it can be guaranteed that delivery of the data does not have excessive delays. To achieve more precise synchronization (e.g. millisecond level) between association of SDF and RI, separate solutions may be needed. Simple example could be to add GPS timestamp to the SDF and RI interface protocols. In the absence of GPS, some external synchronization method could be utilized like Synchronous Ethernet. 2) Memory 624 of DFA 520 may store ASRI data samples. Thus, DFA memory 624 may include a memory to store N latest ASRI samples. The history of samples may be used by DFA 520 to obtain information prior the event that triggered the data association. 3) Rules & program 626 of DFA 520 may include a set of rules, or a program, to trigger the association inside the own DFA instance 520, or to trigger association in another DFA instance through the control interface 620. Rules and program 626 may also specify which ASRI samples are stored to the memory and which samples are sent to the DM 524. The rules can be configured or a separate program downloaded through the configuration interface 618. The rules may include separate rules for different destinations receiving the associated data, for instance; one destination receives filtered data specified by one rule while other destination receives the raw data without filtering. Obviously, this can be achieved with separate DFA instances as well.

Data Management

Figure 7:
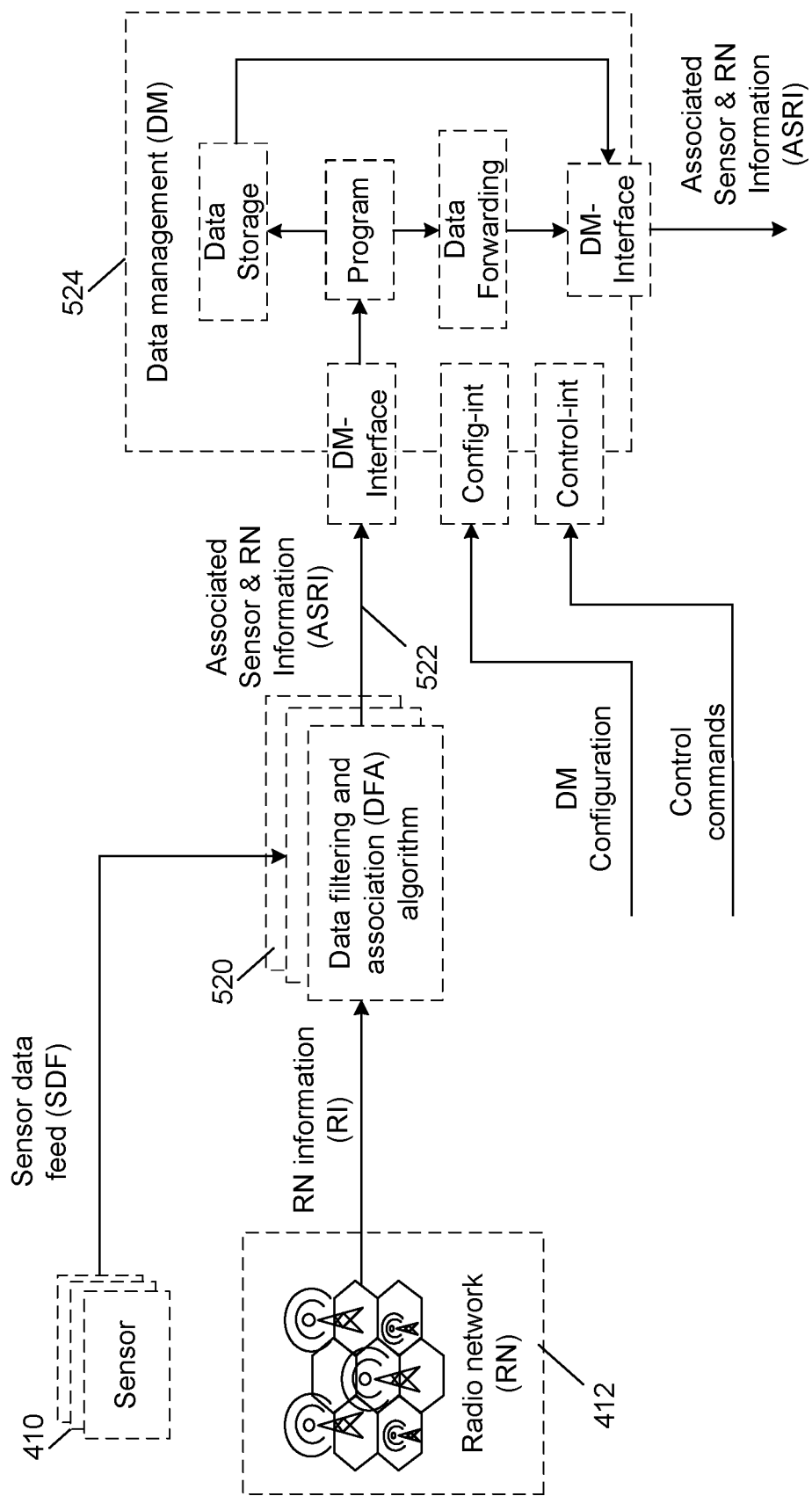
FIG. 7 is a diagram of a data management entity according to an example embodiment.

FIG. 7 is a diagram of a data management entity according to an example embodiment. The role of DM (Data Management) may include, for example: Receive the ASRI, store the ASRI, and/or forward the received ASRI. Fetch and send the ASRI from the memory to a given destination on demand. DM-Interface(s) 716 defines an interface protocol to transfer ASRI-data to and/or from DM 524. Data Storage 712 is a logical entity that stores the ASRI, e.g., within a database. Program part 714 is specified by the configuration interface and it determines which ASRI samples are stored and which ASRI samples are forwarded (e.g. data from source A may be configured to be stored while the data from source B is forwarded to a predefined destination, with or without storing the data first). Data forwarding 718 may determine which data samples are forwarded. Configuration Interface 720 defines a protocol to configure the DM 524. The configuration may include, e.g., data forwarding rules for specific sources. Control Interface 722 defines a protocol to fetch data or information from the storage.

Figure 8:
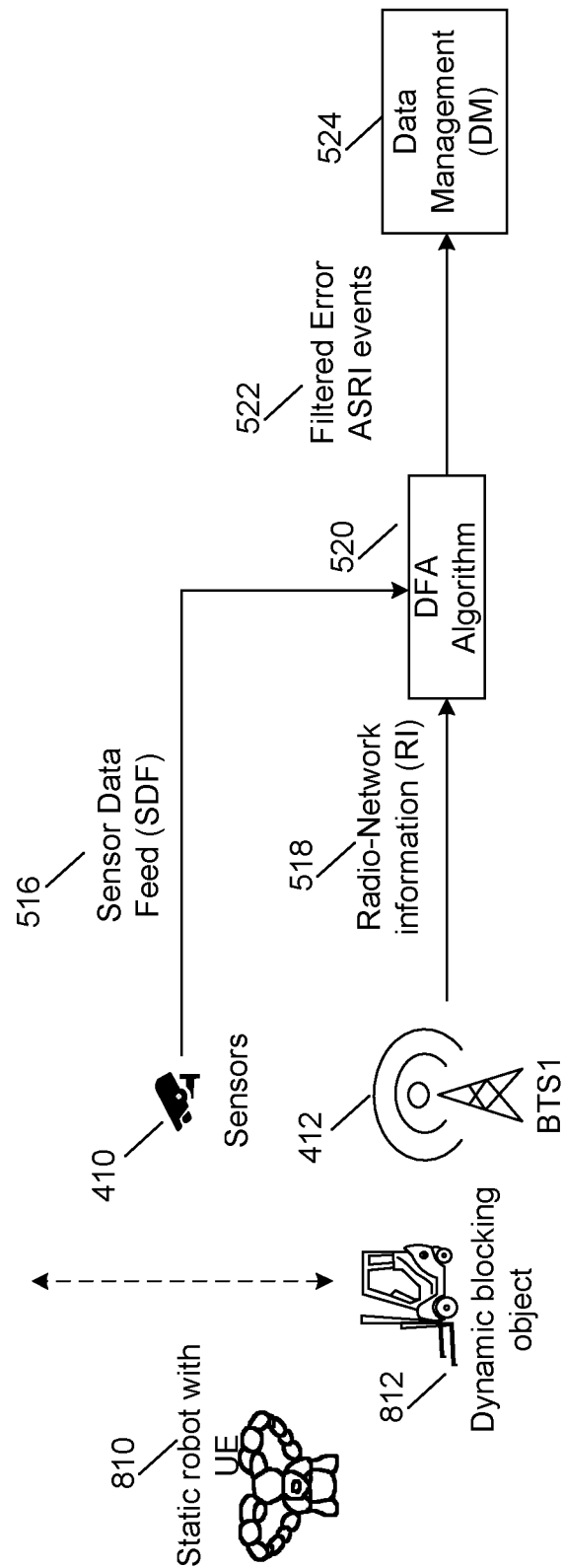
FIG. 8 is a diagram illustrating a robot 810 with a user equipment (UE), and a dynamic or moving blocking object 812 that impacts radio network performance for the UE.
Figure 9:
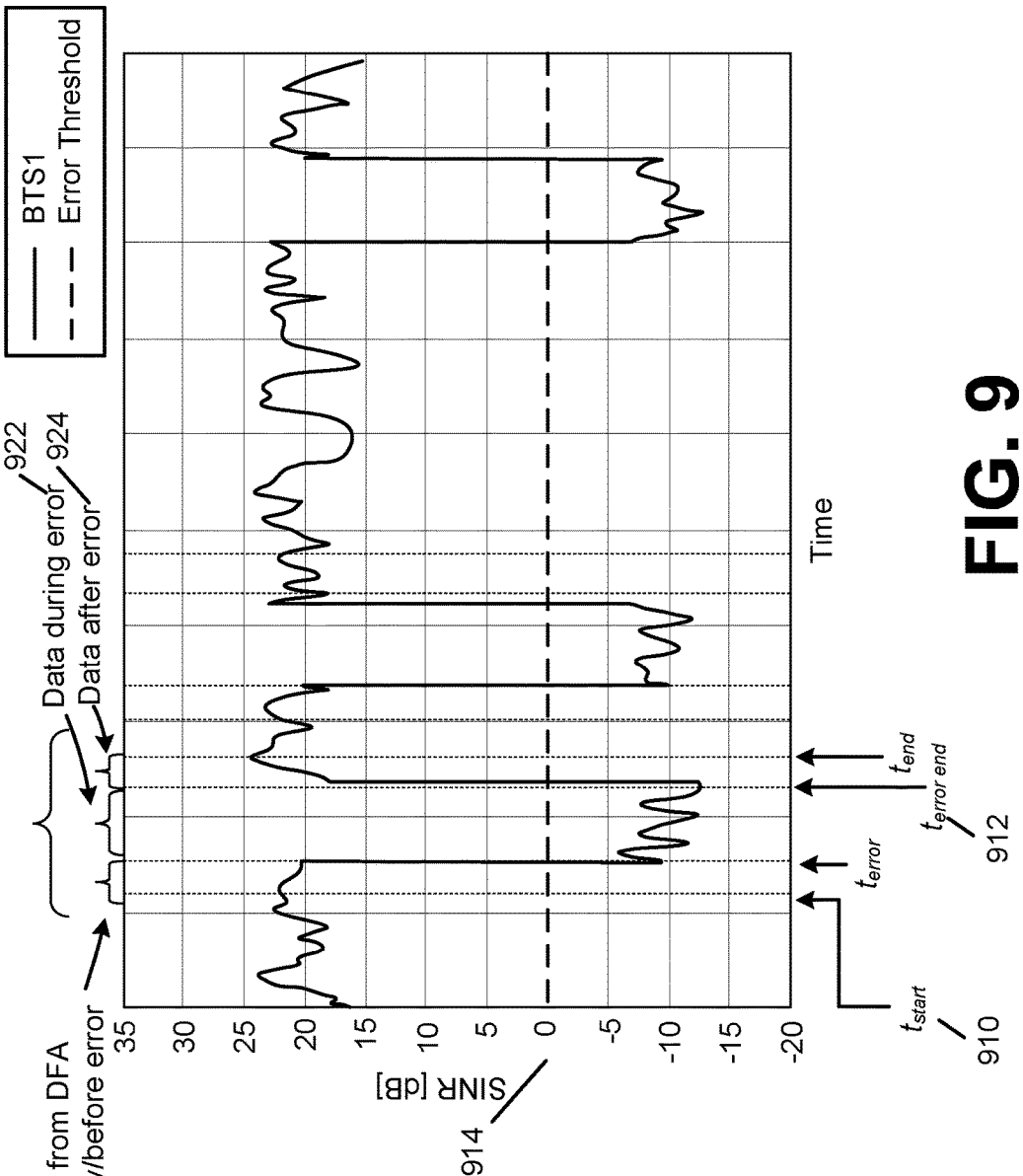
FIG. 9 is a diagram illustrating radio network information (RI) for a time period that is before an error, during an error, and after an error.

FIG. 8 is a diagram illustrating a robot 810 with a user equipment (UE), and a dynamic or moving blocking object 812 that impacts radio network performance for the UE. FIG. 9 is a diagram illustrating radio network information (RI) for a time period that is before an error, during an error, and after an error. As shown in FIG. 8, a dynamic object 812 in a factory randomly blocks the signal between robot-UE 810 and BTS1 412. When the object 812 is blocking the radio signal, SINR drops below a threshold, which may be considered an error (FIG. 9). DFA instance 520 is configured to monitor the error event (e.g., monitor SINR, including when SINR drops below threshold 914, FIG. 9) caused by the blockage. Sensor data feed 516 is video images provided by a camera attached to the BTS1. When the RI (radio network information) (e.g., SINR) indicates the error (e.g., when SINR drops below threshold 914, FIG. 9), the data association is triggered between the video images (SDF) and SINR (RI). The data (ASRI) before the error/event (920) is fetched from the DFA memory and is forwarded with the data (ASRI samples) during (922) the error and the data (ASRI samples) (924) after the error event. Before sending the ASRI samples, the samples are labelled to indicate which event triggered the association, and the state of the error (pre-error—error—post-error). The data association is ended according to a preconfigured rule being in this case some time interval after the error has ended. This data is forwarded for the DM 524 that is visualized in FIG. 9 as bursts of data from the three detected errors. As shown in FIG. 9, data samples are shown for time periods before the error (920), during the error (922) and after the error (924). Also as shown in FIG. 9, the ASRI (associated SINR data and video frames) are filtered and provided as: pre-error ASRI; ASRI during error, and ASRI post-error. Note, that the term error in this example indicates that a signal (e.g., SINR) has crossed a specific threshold, e.g., SINR has dropped below threshold 914.

Figure 10:
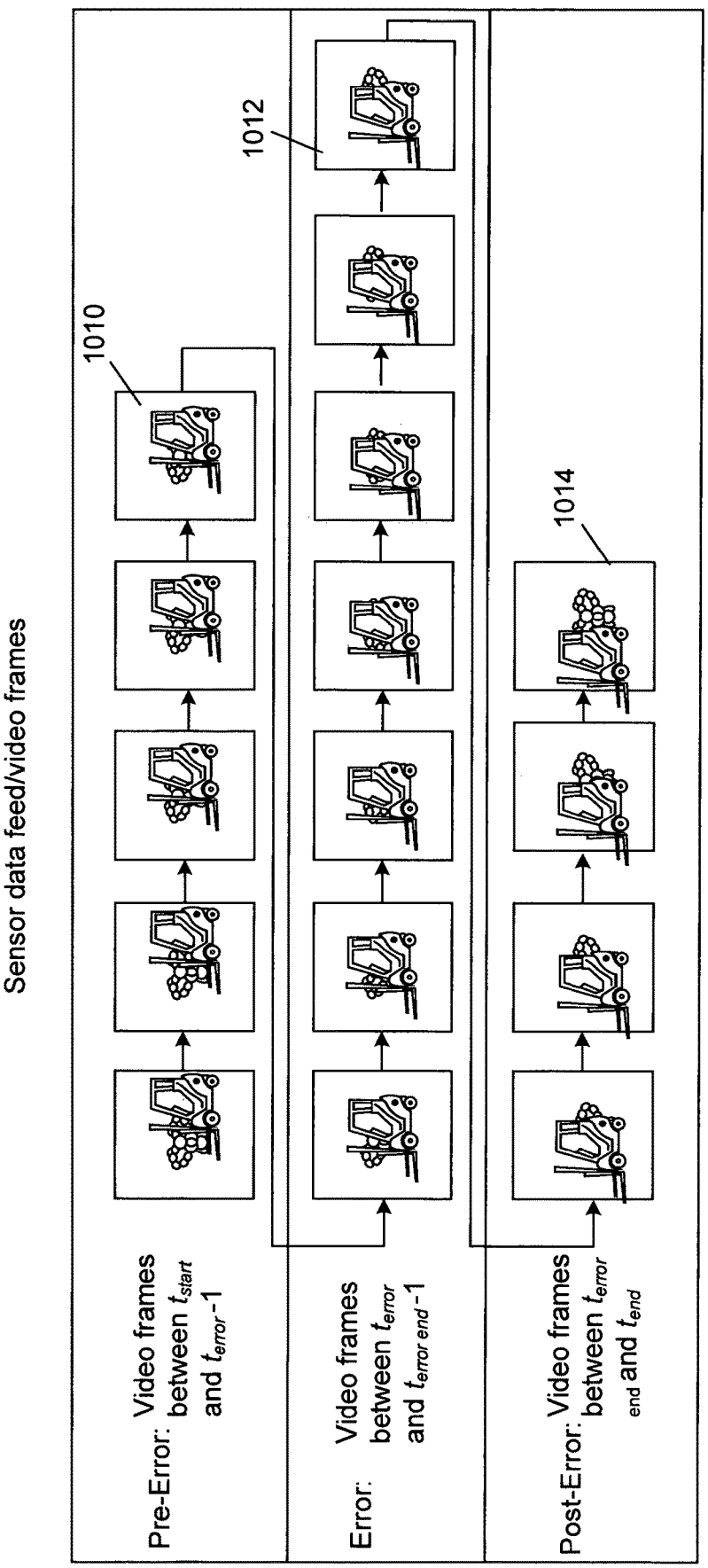
FIG. 10 illustrates video frames of video of the dynamic blocking object within pre-error, error and post-error locations.
Figure 11:
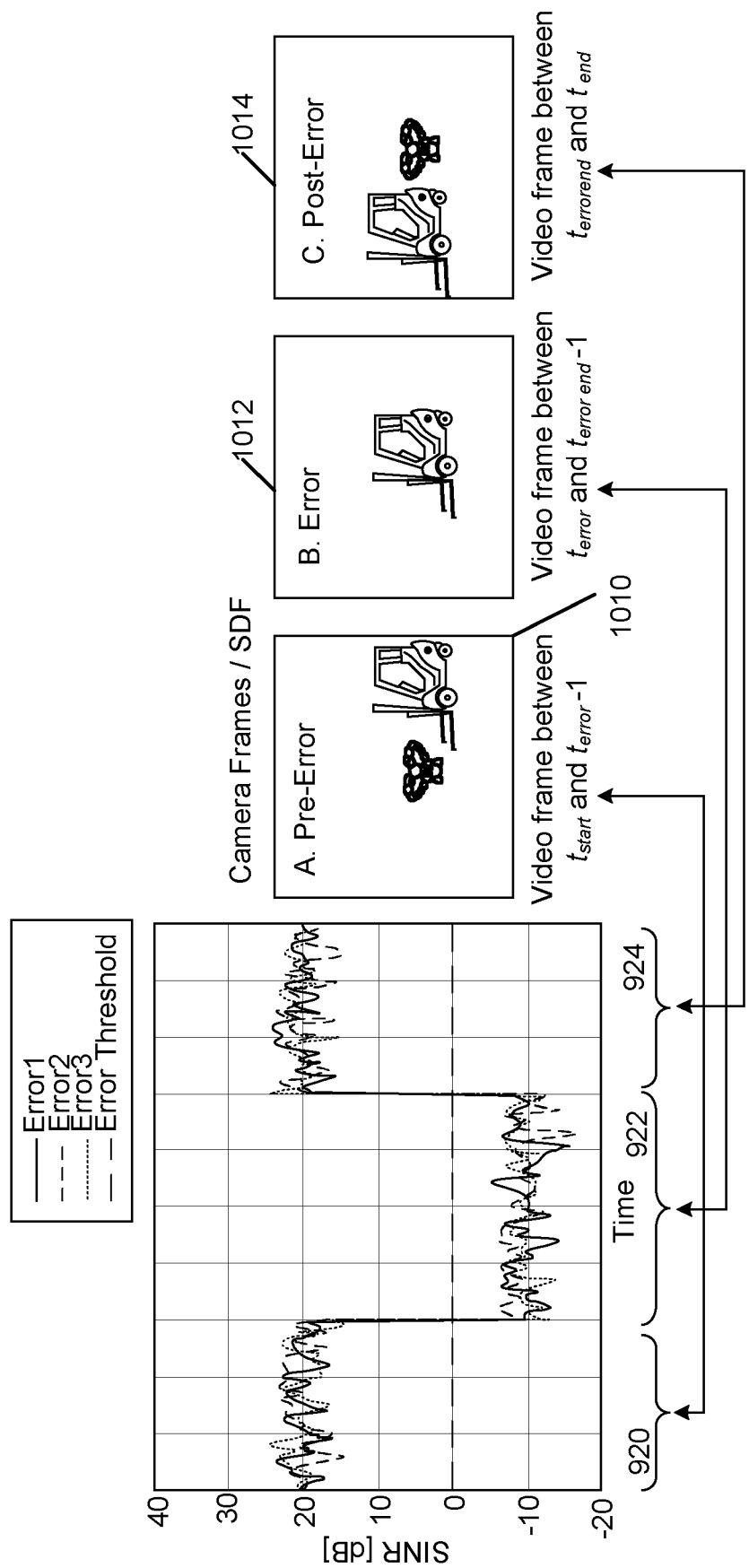
FIG. 11 is a diagram illustrating data that is forwarded or received for pre-error, error and post-error times, associated with different video frames.

The data association and labelling are further demonstrated with FIGS. 9 and 10. FIG. 11 is a diagram illustrating data that is forwarded or received for pre-error, error and post-error times, associated with different video frames. As shown in FIG. 9, an error event occurs when the SINR drops below the threshold 914. As noted, this may occur when the dynamic blocking object 812 is within a specific range of locations or positions. FIG. 10 illustrates video frames of video of the dynamic blocking object 812 within pre-error locations 1010 (e.g., video frames of object 812 prior to the error condition); during the error 1012 (e.g., video frames of object 812 when the SINR of UE is below threshold 914, or during error condition); and after the error condition 1014 (video frames of object 812 after the error condition). Thus, video frames at 1010 shown that before the error the dynamic object 812 is approaching; video frames at 1012 show that during the error the dynamic object 812 is in front of the UE; and video frames at 1014 show that after the error the object 812 is moving further away. In this illustrative example, the error events caused by the blockage show similar behavior with the SINR and video frames. This is demonstrated with FIG. 11 showing the typical video frames before-during-after the error and the SINR curves aligned based on the video images. This figure demonstrates that storing this type of data stores information that may be related to the root cause of the error caused by the signal blockage.

There are several different deployment options. The options may be described by the physical or logical locations of the sensors, DFA-Algorithm instances and DM instances. Each of the mentioned can be integral and/or external part of the RN. This means that the number of deployment options is very large and therefore only a few example deployments are demonstrated here, by way of illustrative example.

Figure 12:
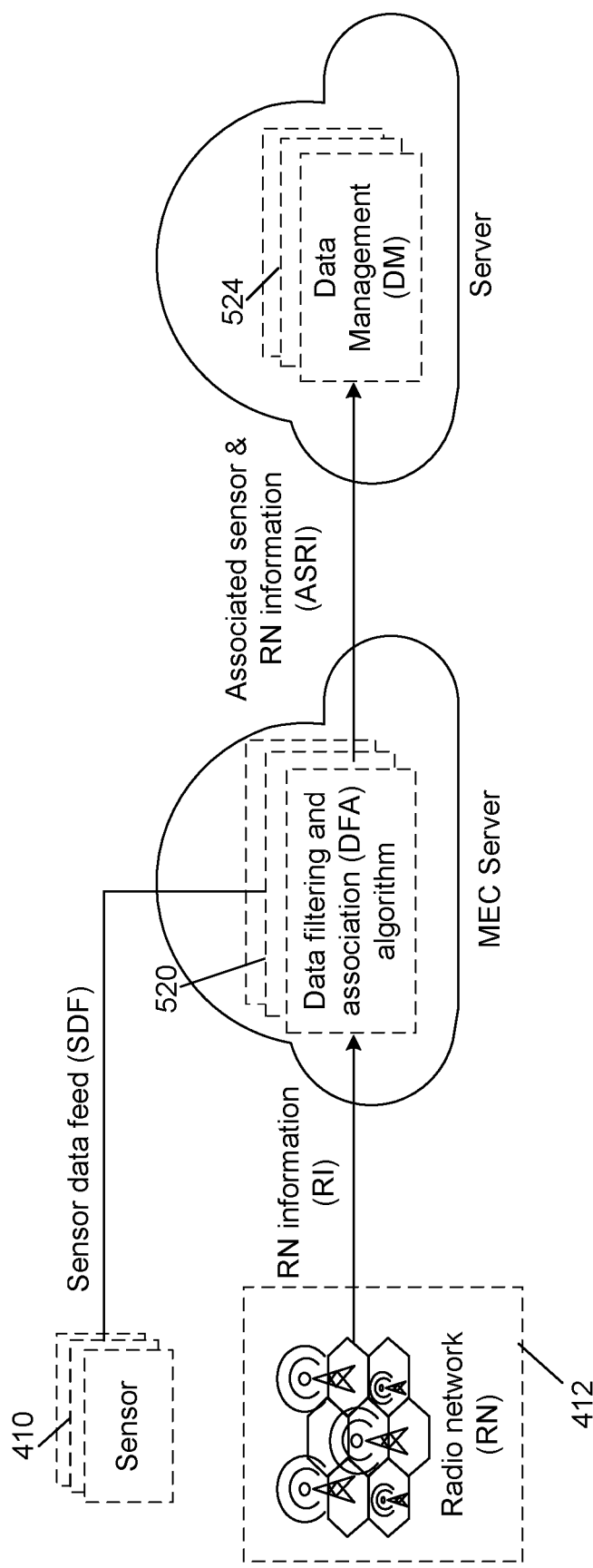
FIG. 12 is a diagram illustrating a deployment option where the DFA-Algorithm is inside a Multi-Access Edge Cloud (MEC) server.
Figure 13:
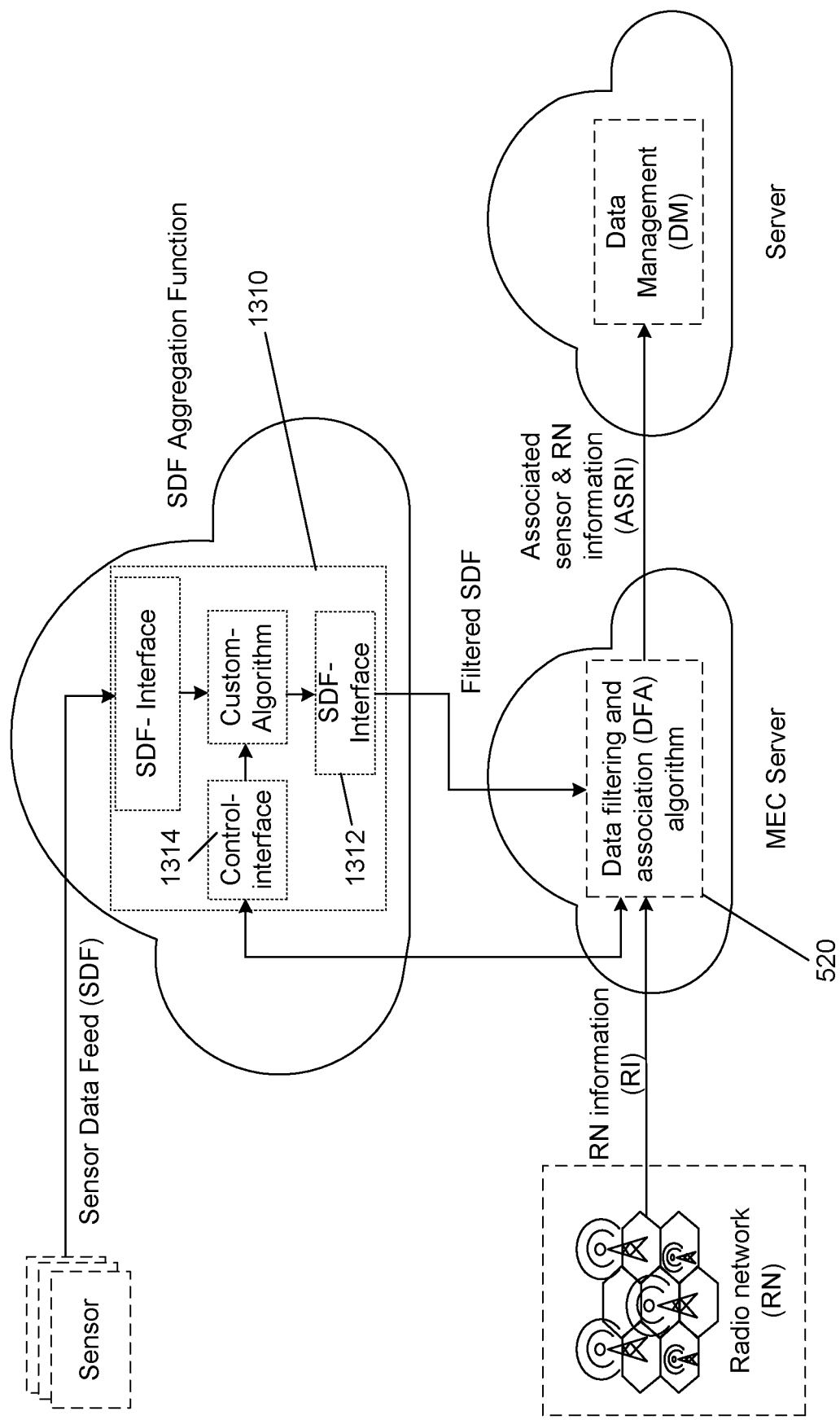
FIG. 13 is a diagram illustrating a similar deployment as with FIG. 12, with a difference that the sensor data is aggregated to a SDF Aggregation Function.

FIG. 12 is a diagram illustrating a deployment option where the DFA-Algorithm 520 is inside a Multi-Access Edge Cloud (MEC) server. The RI and SDF are continuously fed for the DFA instance. FIG. 13 is a diagram illustrating a similar deployment as with FIG. 12, with the difference that the sensor data is aggregated to a SDF Aggregation Function 1310 which forwards the SDFs when requested by the DFA-Instance 520. This approach demonstrates at least two benefits compared to the example, of FIG. 12: Sensors do not have to implement the SDF interface, and the SDF aggregation function 1310 can forward the SDFs over the SDF-Interface 1312. The control interface 1314 can be used to reduce the amount of data from SDFs to save transmission bandwidth. This can be done by sending a control message by the DFA-Algorithm 520 when the data is needed for association.

Figure 14:
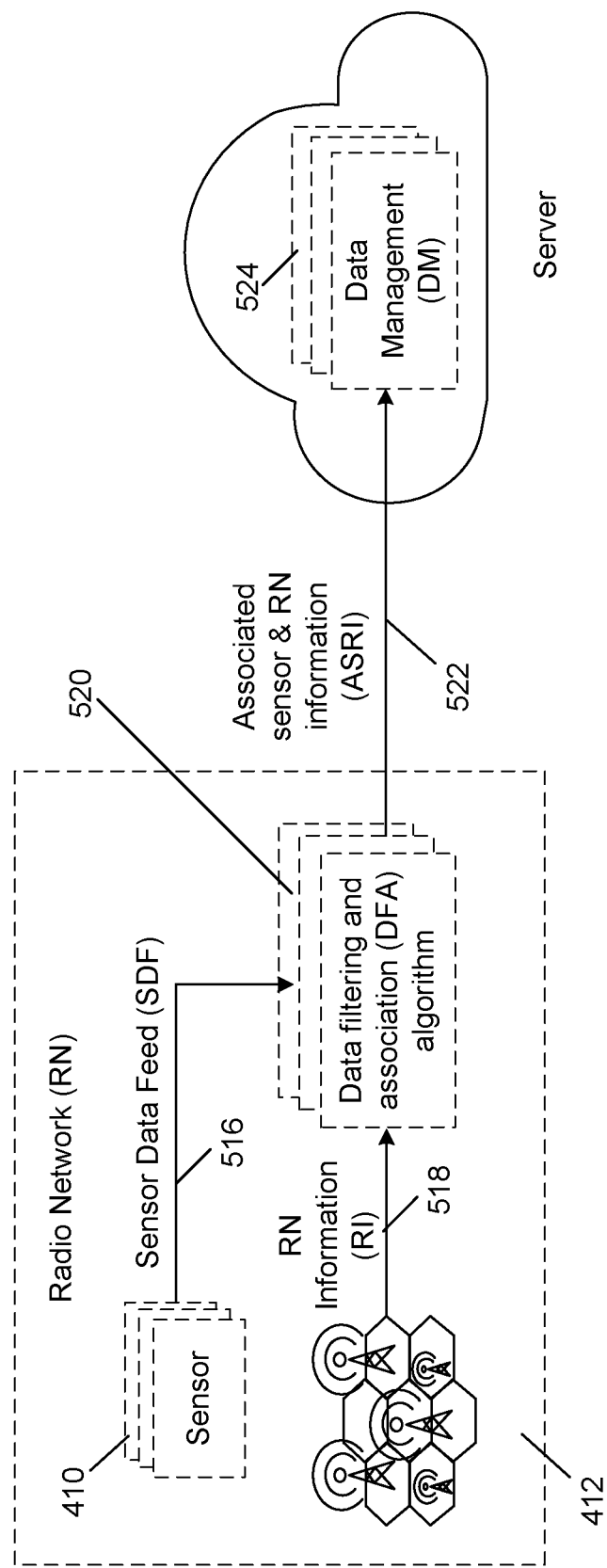
FIG. 14 is a diagram shows deployment option where the sensors and DFA-Algorithm instances 520 are inside the radio network (RN) 412.

FIG. 14 is a diagram shows deployment option where the sensors and DFA-Algorithm instances 520 are inside the radio network (RN) 412. Sensor data feed 516 and RI data samples 518 are shown. For instance, cameras (example sensors) could be integrated to base stations (BSs, within the RN 412) and each base station may have DFA-Algorithm instance 520 which forwards ASRI data 522 to the DM 524 outside RN. Advantages of this approach may include the possibility of tight synchronization in the association of sensor data and radio network information, and access to sensitive information inside the base station or RN.

Example Advantages: There may be numerous advantages of one or more of the example embodiments, or techniques implemented by one or more of the example embodiments, such as, for example:

Providing associated RI and SDF may be used to make decisions on one or more actions that may be performed to improve RN performance (or actions that may be used to prevent an error), or actions that may be triggered to improve RN performance. These actions that may be triggered may include a RN action (e.g., increasing transmission power, performing a handover of the UE, switching the UE to a more robust MCS, . . . ), or actions associated with the physical environment, e.g., such as changing the movement or timing of movement of a blocking object, changing a positioning or orientation of a blocking object, or other change in status of the physical environment. For example, with respect to FIG. 2, based on previously received ASRI data, it has been observed that when blocking object 218 reaches coordinate of 150 m, and moving left to right, this correlates with an error condition that will last until the blocking object reaches a position of about 350 m. Thus, based on a subsequent ASRI, the system may perform a RN action, such as performing a handover of the UE from BTS1 to BTS2 when blocking object reaches 140 m, or increases transmission power when blocking object reaches 150 m.

The association of RI and sensor data captures additional information on events in the environment that impacts the network performance. In addition, by labelling and storing the data, before and after the events, the information leading to these events are stored which can be used e.g., to train models that are able to predict these events based on live data feed.

For instance, an associated video stream may reveal that the reason for sudden radio link degradation is an object blocking the radio signal (as illustrated in FIG. 2), or an associated press of a button may reveal that opening a door introduces significant interference within certain area of the building from outdoor base stations (as illustrated in FIG. 3).

In an example embodiment, indoor to outdoor isolations may have significant impact on reliability level. For example, in some cases, opening a factory door may be equivalent to isolation reduction of 10 to 20 decibels.

However, it is important to note that the example embodiments and techniques are not restricted to the given examples. The examples and techniques may be applicable to any use case where spatiotemporal changes have impact on radio network performance e.g.: Logistics automation: sensors may track movement of containers, in logistic center or harbor, that have significant impact for the wireless connectivity; Connected hospitals: opening a door in MRI or surgery room may introduce interference (these types of rooms are typically isolated from radio waves); Elevators with wireless connectivity: sensor may track state of the elevators in an elevator shaft which is relevant for the quality of connectivity; Connected-Cars/Trains or eMBB users within cars/trains: sensor data may indicate e.g. that the car/train is approaching 5G network coverage outage area.

This brings several advantages over the earlier solutions, such as;

Performance improvements

The additional information (associated sensor data or ASRI) allows improved and new type of radio network performance optimization leading e.g., to higher reliability of wireless links enabling support for new URLLC use cases.

Lower network mgmt. and optimization costs (OPEX)

The example techniques described herein may allow for automatically detecting root-causes of unwanted radio network behavior, e.g., detecting of causes of an error (such as a decrease in radio network performance, e.g., as measured against a threshold). Also, various example embodiments or techniques may enable continuous detection of changes in the physical environment that impact radio network performance, and to perform continuous optimization which would not be otherwise economically feasible.

Lower deployments costs (CAPEX)

The example techniques described herein may allow for use of lower error margins (e.g., lower interference and fading margins) which translates to less required BTSs/BSs for equal performance, and thus lower CAPEX.

Some example embodiments are now described.

EXAMPLE 1

Figure 15:
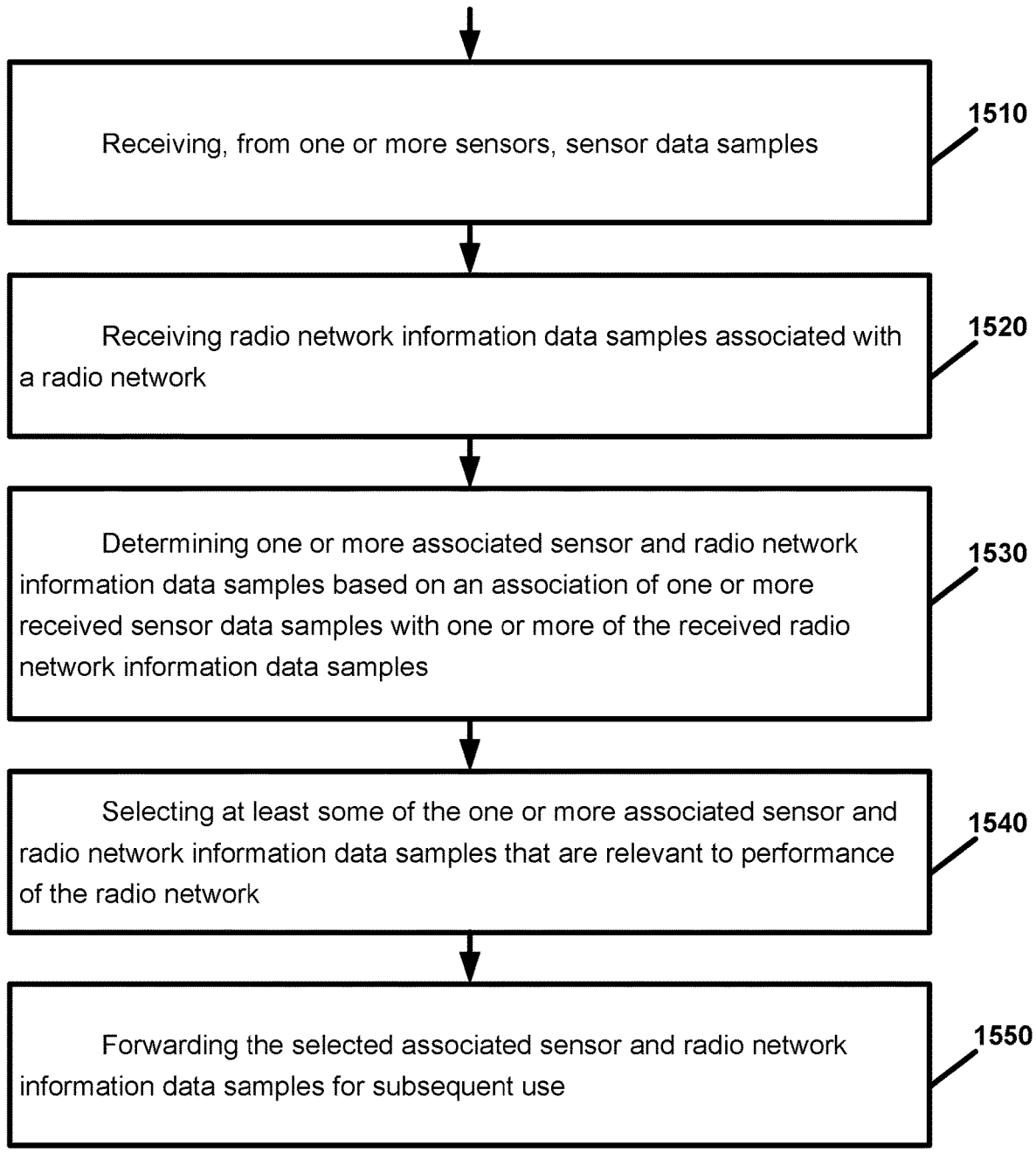
FIG. 15 is a flow chart illustrating operation of a system according to an example embodiment.

FIG. 15 is a flow chart illustrating operation of a system according to an example embodiment. Operation 1510 includes receiving, from one or more sensors, sensor data samples. Operation 1520 includes receiving radio network information data samples associated with a radio network. Operation 1530 includes determining one or more associated sensor and radio network information data samples based on an association of one or more received sensor data samples with one or more of the received radio network information data samples. Operation 1540 includes selecting at least some of the one or more associated sensor and radio network information data samples that are relevant to performance of the radio network. Operation 1550 includes forwarding the selected associated sensor and radio network information data samples for subsequent use.

EXAMPLE 2

According to an example embodiment of the method of example 1, the sensor data samples comprise spatiotemporal sensor data samples associated with a physical environment.

EXAMPLE 3

According to an example embodiment of the method of any of examples 1-2, the forwarding comprises at least one of: storing the selected associated sensor and radio network information data samples; and forwarding the selected associated sensor and radio network information data samples for processing.

EXAMPLE 4

According to an example embodiment of the method of any of examples 1-3 and further comprising: performing, based on the selected associated sensor and radio network information data samples, at least one action to improve performance of the radio network.

EXAMPLE 5

According to an example embodiment of the method of any of examples 1-4, the performing at least one action comprises performing at least one of the following: one or more radio network actions; one or more automated radio network actions; one or more automated radio network actions triggered by a network self-optimization algorithm; and, one or more non-radio network actions where an object or an aspect of the physical environment is changed to improve performance of the radio network.

EXAMPLE 6

According to an example embodiment of the method of any of examples 1-5, the receiving, from one or more sensors, sensor data samples comprises receiving sensor data samples associated with one or more of the following: a button, switch, or controller that controls an object or portion of the physical environment; a button, switch, or controller that controls a position, location, orientation or a movement of an object; a button, switch, or controller that controls a status or state of an object; a camera that captures images or video feed of an object or portion of a physical environment; and a sensor that detects a status or state of an object or portion of the physical environment.

EXAMPLE 7

According to an example embodiment of the method of any of examples 1-6, the receiving sensor data samples associated with a sensor that detects a status or state of an object or portion of the physical environment comprises: receiving the sensor data samples from a Radar or LiDAR that performs detection, ranging, bearing or location determination of an object or portion of the physical environment.

EXAMPLE 8

According to an example embodiment of the method of any of examples 1-7, the receiving radio network information associated with a radio network comprises receiving at least one of the following: a radio network key performance indicator for the radio network; information associated with a radio network action; and a radio network configuration parameter.

EXAMPLE 9

According to an example embodiment of the method of any of examples 1-8, the radio network key performance indicator comprises at least one of: a received signals strength; a total received power; a received interference power; and a signal to interference plus noise ratio (SINR); a pathloss; a reference signal received power; a reference signal received quality; a received signal strength indicator; a reliability; a block error rate; a latency; a jitter; a coverage; a capacity; a data transfer rate; a rank indicator; a modulation and coding scheme indicator; a channel state information; and a timing advance.

EXAMPLE 10

According to an example embodiment of the method of any of examples 1-9, the radio network configuration parameter for the radio network comprises at least one of an identifier, a configuration, or a coordinate of a base station or a user device.

EXAMPLE 11

According to an example embodiment of the method of any of examples 1-10, the information associated with a radio network action comprises information associated with at least one of the following: a handover of a user device to a target base station; a load balancing of traffic or data between two or more base stations; a link adaptation for a radio link between a base station and a user device; a cell selection or cell reselection performed by a user device; a scheduling; a resource allocation; a transmit power control; and a timing advance adjustment.

EXAMPLE 12

According to an example embodiment of the method of any of examples 1-11, the determining one or more associated sensor and radio network information data samples comprises: determining, based on a time of one or more sensor data samples being within a time window of one or more of the radio network information data samples, one or more associated sensor and radio network information data samples.

EXAMPLE 13

According to an example embodiment of the method of any of examples 1-12, the determining one or more associated sensor and radio network information data samples comprises: determining that a first sensor is paired or associated with at least a first communications element; determining, one or more associated sensor and radio network information data samples based on a time of one or more sensor data samples from the first sensor that are within a time window of one or more of the radio network information data samples associated with at least the first communications element.

EXAMPLE 14

According to an example embodiment of the method of any of examples 1-13, the first communications element comprises at least one of: a computer or a server; and a radio network element associated with the radio network, including at least one of a base station, a user device, a core network element, or other radio network element.

EXAMPLE 15

According to an example embodiment of the method of any of examples 1-14, the selecting at least some of the one or more associated sensor and radio network information data samples that are relevant to performance of the radio network comprises at least one of: selecting at least some of the one or more associated sensor and radio network information data sample that occur or are sampled before a change in performance of the radio network; selecting at least some of the one or more associated sensor and radio network information data sample that occur or are sampled during a change in performance of the radio network; and selecting at least some of the one or more associated sensor and radio network information data sample that occur or are sampled after a change in performance of the radio network.

EXAMPLE 16

According to an example embodiment of the method of any of examples 1-15, the selecting at least some of the one or more associated sensor and radio network information data samples that are relevant to performance of the radio network comprises at least one of: selecting at least some of the one or more associated sensor and radio network information data sample that occur or are sampled before a decrease in performance of the radio network; selecting at least some of the one or more associated sensor and radio network information data sample that occur or are sampled during a decrease in performance of the radio network; and selecting at least some of the one or more associated sensor and radio network information data sample that occur or are sampled after a decrease in performance of the radio network.

EXAMPLE 17

According to an example embodiment of the method of any of examples 1-16, and further comprising: labeling a reason for selection of the selected associated sensor and radio network information data samples that are relevant to performance of the radio network.

EXAMPLE 18

An apparatus comprising means for performing a method of any of examples 1-17.

EXAMPLE 19

A non-transitory computer-readable storage medium comprising instructions stored thereon that, when executed by at least one processor, are configured to cause a computing system to perform a method of any of examples 1-17.

EXAMPLE 20

An apparatus comprising at least one processor and at least one memory including computer instructions, when executed by the at least one processor, cause the apparatus to perform a method of any of examples 1-17.

EXAMPLE 21

An apparatus comprising at least one processor and at least one memory including computer instructions, when executed by the at least one processor, cause the apparatus to: receive, from one or more sensors, sensor data samples; receive radio network information data samples associated with a radio network; determine one or more associated sensor and radio network information data samples based on an association of one or more received sensor data samples with one or more of the received radio network information data samples; select at least some of the one or more associated sensor and radio network information data samples that are relevant to performance of the radio network; and forward the selected associated sensor and radio network information data samples for subsequent use.

EXAMPLE 22

The apparatus of example 21 wherein the sensor data samples comprise spatiotemporal sensor data samples associated with a physical environment.

EXAMPLE 23

The apparatus of any of examples 21-22 wherein causing the apparatus to forward comprises causing at least one of: store the selected associated sensor and radio network information data samples; and forward the selected associated sensor and radio network information data samples for processing.

EXAMPLE 24

The apparatus of any of examples 21-23 and further causing the apparatus to: perform, based on the selected associated sensor and radio network information data samples, at least one action to improve performance of the radio network.

EXAMPLE 25

The apparatus of example 24 wherein the causing the apparatus to perform at least one action comprises causing the apparatus to perform at least one of the following: one or more radio network actions; one or more automated radio network actions; one or more automated radio network actions triggered by a network self-optimization algorithm; one or more non-radio network actions where an object or an aspect of the physical environment is changed to improve performance of the radio network.

EXAMPLE 26

The apparatus of any of examples 21-25 wherein causing the apparatus to receive, from one or more sensors, sensor data samples comprises causing the apparatus to receive sensor data samples associated with one or more of the following: a button, switch, or controller that controls an object or portion of the physical environment; a button, switch, or controller that controls a position, location, orientation or a movement of an object; a button, switch, or controller that controls a status or state of an object; a camera that captures images or video feed of an object or portion of a physical environment; and a sensor that detects a status or state of an object or portion of the physical environment.

EXAMPLE 27

The apparatus of example 26, wherein causing the apparatus to receive sensor data samples associated with a sensor that detects a status or state of an object or portion of the physical environment comprises causing the apparatus to: receive the sensor data samples from a Radar or LiDAR that performs detection, ranging, bearing or location determination of an object or portion of the physical environment.

EXAMPLE 28

The apparatus of any of examples 21-27 wherein causing the apparatus to receive radio network information associated with a radio network comprises causing the apparatus to receive at least one of the following: a radio network key performance indicator for the radio network; information associated with a radio network action; and a radio network configuration parameter.

EXAMPLE 29

The apparatus of example 28 wherein the radio network key performance indicator comprises at least one of: a received signal strength; a total received power; a received interference power; and a signal to interference plus noise ratio (SINR); a pathloss; a reference signal received power; a reference signal received quality; a received signal strength indicator; a reliability; a block error rate; a latency; a jitter; a coverage; a capacity; a data transfer rate; a rank indicator; a modulation and coding scheme indicator; a channel state information; and a timing advance.

EXAMPLE 30

The apparatus of any of examples 28-29 wherein the radio network configuration parameter for the radio network comprises at least one of an identifier, a configuration, or a coordinate of a base station or a user device.

EXAMPLE 31

The apparatus of any of examples 28-30 wherein the information associated with a radio network action comprises information associated with at least one of the following: a handover of a user device to a target base station; a load balancing of traffic or data between two or more base stations; a link adaptation for a radio link between a base station and a user device; a cell selection or cell reselection performed by a user device; a scheduling; a resource allocation; a transmit power control; and a timing advance adjustment.

EXAMPLE 32

The apparatus of any of examples 21-31 wherein causing the apparatus to determine one or more associated sensor and radio network information data samples comprises causing the apparatus to: determine, based on a time of one or more sensor data samples being within a time window of one or more of the radio network information data samples, one or more associated sensor and radio network information data samples.

EXAMPLE 33

The apparatus of any of examples 21-32 wherein causing the apparatus to determine one or more associated sensor and radio network information data samples comprises causing the apparatus to: determine that a first sensor is paired or associated with at least a first communications element; and determine one or more associated sensor and radio network information data samples based on a time of one or more sensor data samples from the first sensor that are within a time window of one or more of the radio network information data samples associated with at least the first communications element.

EXAMPLE 34

The apparatus of example 33 wherein the first communications element comprises at least one of: a computer or a server; and a radio network element associated with the radio network, including at least one of a base station, a user device, a core network element, or other radio network element.

EXAMPLE 35

The apparatus of any of examples 21-34 wherein causing the apparatus to select at least some of the one or more associated sensor and radio network information data samples that are relevant to performance of the radio network comprises causing the apparatus to perform at least one of: select at least some of the one or more associated sensor and radio network information data sample that occur or are sampled before a change in performance of the radio network; select at least some of the one or more associated sensor and radio network information data sample that occur or are sampled during a change in performance of the radio network; and select at least some of the one or more associated sensor and radio network information data sample that occur or are sampled after a change in performance of the radio network.

EXAMPLE 36

The apparatus of any of examples 21-35 wherein causing the apparatus to select at least some of the one or more associated sensor and radio network information data samples that are relevant to performance of the radio network comprise causing the apparatus to perform at least one of: select at least some of the one or more associated sensor and radio network information data sample that occur or are sampled before a decrease in performance of the radio network; select at least some of the one or more associated sensor and radio network information data sample that occur or are sampled during a decrease in performance of the radio network; and select at least some of the one or more associated sensor and radio network information data sample that occur or are sampled after a decrease in performance of the radio network.

EXAMPLE 37

The method of any of examples 21-36 and further causing the apparatus to: label a reason for selection of the selected associated sensor and radio network information data samples that are relevant to performance of the radio network.

Figure 16:
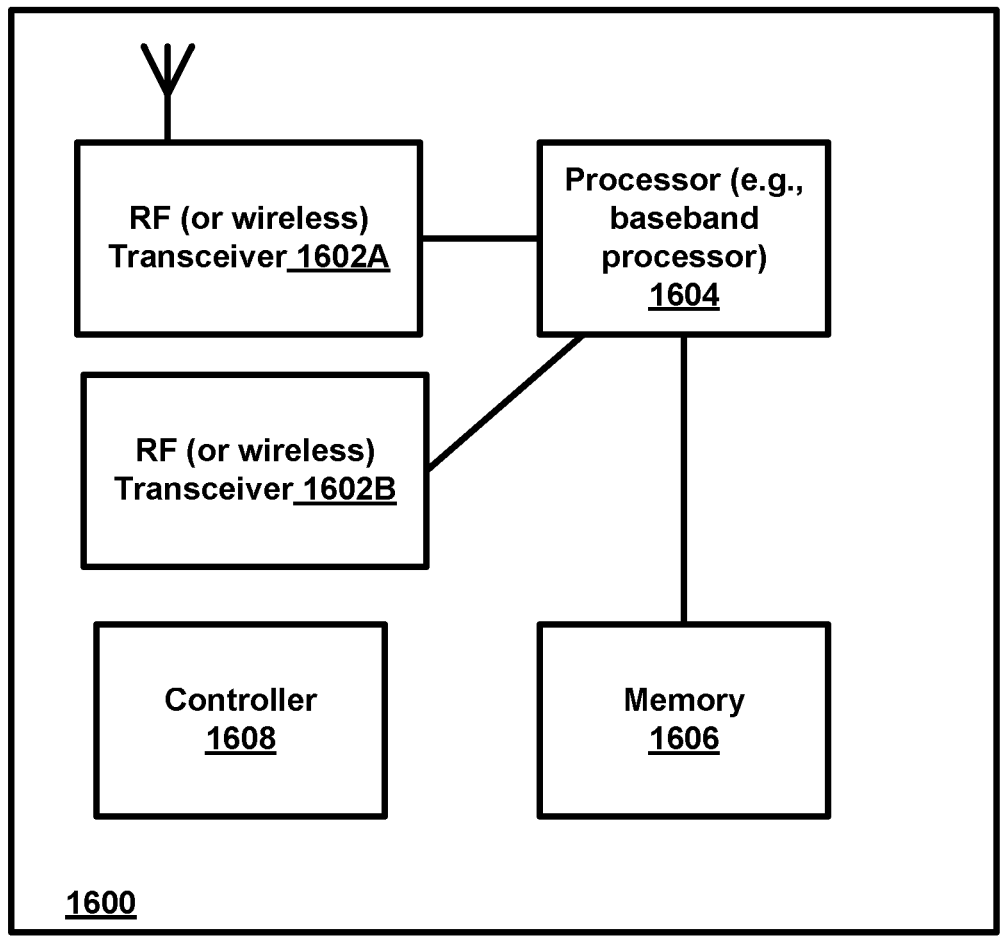
FIG. 16 is a block diagram of a wireless station (e.g., AP, BS or user device, or other network node) according to an example embodiment.

FIG. 16 is a block diagram of a wireless station (e.g., AP, BS or user device, or other network node) 1600 according to an example embodiment. The wireless station 1600 may include, for example, one or two RF (radio frequency) or wireless transceivers 1602A, 1602B, where each wireless transceiver includes a transmitter to transmit signals and a receiver to receive signals. The wireless station also includes a processor or control unit/entity (controller) 1604 to execute instructions or software and control transmission and receptions of signals, and a memory 1606 to store data and/or instructions.

Processor 1604 may also make decisions or determinations, generate frames, packets or messages for transmission, decode received frames or messages for further processing, and other tasks or functions described herein. Processor 1604, which may be a baseband processor, for example, may generate messages, packets, frames or other signals for transmission via wireless transceiver 1602 (1602A or 1602B). Processor 1604 may control transmission of signals or messages over a wireless network, and may control the reception of signals or messages, etc., via a wireless network (e.g., after being down-converted by wireless transceiver 1602, for example). Processor 1604 may be programmable and capable of executing software or other instructions stored in memory or on other computer media to perform the various tasks and functions described above, such as one or more of the tasks or methods described above. Processor 1604 may be (or may include), for example, hardware, programmable logic, a programmable processor that executes software or firmware, and/or any combination of these. Using other terminology, processor 1604 and transceiver 1602 together may be considered as a wireless transmitter/receiver system, for example.

In addition, referring to FIG. 16, a controller (or processor) 1608 may execute software and instructions, and may provide overall control for the station 1600, and may provide control for other systems not shown in FIG. 16, such as controlling input/output devices (e.g., display, keypad), and/or may execute software for one or more applications that may be provided on wireless station 1600, such as, for example, an email program, audio/video applications, a word processor, a Voice over IP application, or other application or software.

In addition, a storage medium may be provided that includes stored instructions, which when executed by a controller or processor may result in the processor 1604, or other controller or processor, performing one or more of the functions or tasks described above.

According to another example embodiment, RF or wireless transceiver(s) 1602A/1602B may receive signals or data and/or transmit or send signals or data. Processor 1604 (and possibly transceivers 1602A/1602B) may control the RF or wireless transceiver 1602A or 1602B to receive, send, broadcast or transmit signals or data.

The embodiments are not, however, restricted to the system that is given as an example, but a person skilled in the art may apply the solution to other communication systems. Another example of a suitable communications system is the 5G concept. It is assumed that network architecture in 5G will be quite similar to that of the LTE-advanced. 5G is likely to use multiple input-multiple output (MIMO) antennas, many more base stations or nodes than the LTE (a so-called small cell concept), including macro sites operating in co-operation with smaller stations and perhaps also employing a variety of radio technologies for better coverage and enhanced data rates.

It should be appreciated that future networks will most probably utilise network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations may be carried out, at least partly, in a server, host or node operationally coupled to a remote radio head. It is also possible that node operations will be distributed among a plurality of servers, nodes or hosts. It should also be understood that the distribution of labour between core network operations and base station operations may differ from that of the LTE or even be non-existent.

Embodiments of the various techniques described herein may be implemented in digital electronic circuitry, or in computer hardware, firmware, software, or in combinations of them. Embodiments may implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. Embodiments may also be provided on a computer readable medium or computer readable storage medium, which may be a non-transitory medium. Embodiments of the various techniques may also include embodiments provided via transitory signals or media, and/or programs and/or software embodiments that are downloadable via the Internet or other network(s), either wired networks and/or wireless networks. In addition, embodiments may be provided via machine type communications (MTC), and also via an Internet of Things (IOT).

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers.

Furthermore, embodiments of the various techniques described herein may use a cyber-physical system (CPS) (a system of collaborating computational elements controlling physical entities). CPS may enable the embodiment and exploitation of massive amounts of interconnected ICT devices (sensors, actuators, processors microcontrollers, . . . ) embedded in physical objects at different locations. Mobile cyber physical systems, in which the physical system in question has inherent mobility, are a subcategory of cyber-physical systems. Examples of mobile physical systems include mobile robotics and electronics transported by humans or animals. The rise in popularity of smartphones has increased interest in the area of mobile cyber-physical systems. Therefore, various embodiments of techniques described herein may be provided via one or more of these technologies.

A computer program, such as the computer program(s) described above, can be written in any form of programming language, including compiled or interpreted languages, and can be deployed in any form, including as a stand-alone program or as a module, component, subroutine, or other unit or part of it suitable for use in a computing environment. A computer program can be deployed to be executed on one computer or on multiple computers at one site or distributed across multiple sites and interconnected by a communication network.

Method steps may be performed by one or more programmable processors executing a computer program or computer program portions to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer, chip or chipset. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, embodiments may be implemented on a computer having a display device, e.g., a cathode ray tube (CRT) or liquid crystal display (LCD) monitor, for displaying information to the user and a user interface, such as a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments may be implemented in a computing system that includes a back-end component, e.g., as a data server, or that includes a middleware component, e.g., an application server, or that includes a front-end component, e.g., a client computer having a graphical user interface or a Web browser through which a user can interact with an embodiment, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described embodiments have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

What is claimed is:

1. A method comprising:
   receiving, from one or more sensors, sensor data samples via a first data stream;
   receiving radio network information data samples associated with a radio network via a second data stream;
   associating one or more received sensor data samples with one or more of the received radio network information data samples based on a time window;
   selecting at least some of the one or more associated sensor and radio network information data samples that are relevant to a change in performance of the radio network including at least one of:
      selecting at least some of the one or more associated sensor and radio network information data sample that occur or are sampled before a change in performance of the radio network;
      selecting at least some of the one or more associated sensor and radio network information data sample that occur or are sampled during a change in performance of the radio network; and
      selecting at least some of the one or more associated sensor and radio network information data sample that occur or are sampled after a change in performance of the radio network;
   labeling the selected one or more associated sensor and radio network information data samples to indicate a reason for the selection; and
   forwarding the selected and labeled associated sensor and radio network information data samples for subsequent use.

2. The method of claim 1, wherein the forwarding comprises at least one of:
   storing the selected associated sensor and radio network information data samples; and forwarding the selected associated sensor and radio network information data samples for processing.

3. The method of claim 1, wherein the associated sensor and radio network information data samples are labelled to indicate which event triggered the association, and the method further comprising:
   storing information leading to the events;
   using the information leading to the events to train a model to predict the events based on a live data feed; and
   predictively optimizing at least one radio network parameter.

4. The method of claim 1, wherein the time window is based on a time of one or more sensor data samples being within a threshold time window of one or more of the radio network information data samples, one or more associated sensor and radio network information data samples.

5. The method of claim 1, wherein the associating of one or more associated sensor and radio network information data samples comprises:
   determining that a first sensor is paired or associated with at least a first communications element, wherein the time window based on a time of one or more sensor data samples from the first sensor that are within a threshold time window of one or more of the radio network information data samples associated with at least the first communications element.

6. An apparatus comprising at least one processor and at least one memory including computer instructions, when executed by the at least one processor, cause the apparatus to:
   receive, from one or more sensors, sensor data samples via a first data stream;
   receive radio network information data samples associated with a radio network via a second data stream;

associating one or more received sensor data samples with one or more of the received radio network information data samples based on a time window;

select at least some of the one or more associated sensor and radio network information data samples that are relevant to a change in performance of the radio network including at least one of:
   selecting at least some of the one or more associated sensor and radio network information data sample that occur or are sampled before a change in performance of the radio network;
   selecting at least some of the one or more associated sensor and radio network information data sample that occur or are sampled during a change in performance of the radio network; and
   selecting at least some of the one or more associated sensor and radio network information data sample that occur or are sampled after a change in performance of the radio network;

label the selected one or more associated sensor and radio network information data samples to indicate a reason for the selection; and forward the selected and labeled associated sensor and radio network information data samples for subsequent use.

7. The apparatus of claim 6, wherein causing the apparatus to forward comprises causing at least one of:
   store the selected associated sensor and radio network information data samples; and forward the selected associated sensor and radio network information data samples for processing.

8. The apparatus of claim 6, wherein the associated sensor and radio network information data samples are labelled to indicate which event triggered the association, and further causing the apparatus to:
   store information leading to the events;
   use the information leading to the events to train a model to predict the events based on a live data feed; and
   predictively optimize at least one radio network parameter.

9. The apparatus of claim 6, wherein causing the apparatus to receive sensor data samples associated with a sensor that detects a status or state of an object or portion of the physical environment comprises causing the apparatus to:
   receive the sensor data samples from a Radar or LiDAR that performs detection, ranging, bearing or location determination of an object or portion of the physical environment.

10. The apparatus of claim 6, wherein causing the apparatus to receive radio network information associated with a radio network comprises causing the apparatus to receive at least one of the following:
   a radio network key performance indicator for the radio network;
   information associated with a radio network action; and
   a radio network configuration parameter.

11. The apparatus of claim 10, wherein the radio network configuration parameter for the radio network comprises at least one of an identifier, a configuration, or a coordinate of a base station or a user device.

12. The apparatus of claim 10, wherein the information associated with a radio network action comprises information associated with at least one of the following:
   a handover of a user device to a target base station;
   a load balancing of traffic or data between two or more base stations;
   a link adaptation for a radio link between a base station and a user device;
   a cell selection or cell reselection performed by a user device;
   a scheduling;
   a resource allocation;
   a transmit power control; and
   a timing advance adjustment.

13. The apparatus of claim 6, wherein causing the apparatus to determine one or more associated sensor and radio network information data samples comprises causing the apparatus to:
   determine, based on a time of one or more sensor data samples being within a time window of one or more of the radio network information data samples, one or more associated sensor and radio network information data samples.

14. The apparatus of claim 6, wherein causing the apparatus to determine one or more associated sensor and radio network information data samples comprises causing the apparatus to:
   determine that a first sensor is paired or associated with at least a first communications element, wherein the time window is based on a time of one or more sensor data samples from the first sensor that are within a threshold time window of one or more of the radio network information data samples associated with at least the first communications element.

15. The method of claim 6, wherein the labeling includes a reason for selection of the selected associated sensor and radio network information data samples that are relevant to the decrease in performance of the radio network.

16. A non-transitory computer-readable storage medium comprising instructions stored thereon that, when executed by at least one processor, are configured to cause a computing system to:
   receive, from one or more sensors, sensor data samples via a first data stream;
   receive radio network information data samples associated with a radio network via a second data stream;
   associate one or more received sensor data samples with one or more of the received radio network information data samples based on a time window;
   select at least some of the one or more associated sensor and radio network information data samples that are relevant to a change in performance of the radio network, including at least one of:
      selecting at least some of the one or more associated sensor and radio network information data sample that occur or are sampled before a change in performance of the radio network;
      selecting at least some of the one or more associated sensor and radio network information data sample that occur or are sampled during a change in performance of the radio network; and
      selecting at least some of the one or more associated sensor and radio network information data sample that occur or are sampled after a change in performance of the radio network;
   label the selected one or more associated sensor and radio network information data samples to indicate a reason for the selection; and
   forward the selected and labeled associated sensor and radio network information data samples for subsequent use.

17. A method comprising:
receiving, from one or more sensors, sensor data samples via a first data stream;
receiving radio network information data samples associated with a radio network via a second data stream;
associating one or more received sensor data samples with one or more of the received radio network information data samples based on a time window;
selecting at least some of the one or more associated sensor and radio network information data samples that are relevant to a change in performance of the radio network, including at least one of:
  selecting at least some of the one or more associated sensor and radio network information data sample that occur or are sampled before a decrease in performance of the radio network;
  selecting at least some of the one or more associated sensor and radio network information data sample that occur or are sampled during a decrease in performance of the radio network; and
  selecting at least some of the one or more associated sensor and radio network information data sample that occur or are sampled after a decrease in performance of the radio network;
labeling the selected one or more associated sensor and radio network information data samples to indicate a reason for the selection; and
forwarding the selected and labeled associated sensor and radio network information data samples for subsequent use.

18. An apparatus comprising at least one processor and at least one memory including computer instructions, when executed by the at least one processor, cause the apparatus to:
receive, from one or more sensors, sensor data samples via a first data stream;
receive radio network information data samples associated with a radio network via a second data stream;
associating one or more received sensor data samples with one or more of the received radio network information data samples based on a time window;
select at least some of the one or more associated sensor and radio network information data samples that are relevant to a change in performance of the radio network, including at least one of:
  selecting at least some of the one or more associated sensor and radio network information data sample that occur or are sampled before a decrease in performance of the radio network;
  selecting at least some of the one or more associated sensor and radio network information data sample that occur or are sampled during a decrease in performance of the radio network; and
  selecting at least some of the one or more associated sensor and radio network information data sample that occur or are sampled after a decrease in performance of the radio network;
label the selected one or more associated sensor and radio network information data samples to indicate a reason for the selection; and
forward the selected and labeled associated sensor and radio network information data samples for subsequent use.

19. A non-transitory computer-readable storage medium comprising instructions stored thereon that, when executed by at least one processor, are configured to cause a computing system to:
receive, from one or more sensors, sensor data samples via a first data stream;
receive radio network information data samples associated with a radio network via a second data stream;
associate one or more received sensor data samples with one or more of the received radio network information data samples based on a time window;
select at least some of the one or more associated sensor and radio network information data samples that are relevant to a change in performance of the radio network, includes at least one of:
  selecting at least some of the one or more associated sensor and radio network information data sample that occur or are sampled before a decrease in performance of the radio network;
  selecting at least some of the one or more associated sensor and radio network information data sample that occur or are sampled during a decrease in performance of the radio network; and
  selecting at least some of the one or more associated sensor and radio network information data sample that occur or are sampled after a decrease in performance of the radio network;
label the selected one or more associated sensor and radio network information data samples to indicate a reason for the selection; and
forward the selected and labeled associated sensor and radio network information data samples for subsequent use.

* * * * *